(12) United States Patent
Ogushi

(10) Patent No.: US 7,688,778 B2
(45) Date of Patent: Mar. 30, 2010

(54) WIRELESS COMMUNICATION SYSTEM

(75) Inventor: Minoru Ogushi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 594 days.

(21) Appl. No.: 11/099,472

(22) Filed: Apr. 6, 2005

(65) Prior Publication Data
US 2006/0039316 A1    Feb. 23, 2006

(30) Foreign Application Priority Data
Aug. 20, 2004   (JP) ............... 2004-240245

(51) Int. Cl.
*H04W 4/00*   (2009.01)
(52) U.S. Cl. ............... 370/328; 370/382; 370/392; 370/401; 370/338; 370/472; 455/432.1; 455/456.1; 455/462; 455/74
(58) Field of Classification Search ........... 370/328, 370/401, 382, 310.2, 338, 472, 392; 455/432.1, 455/456.1, 462, 74
See application file for complete search history.

(56) References Cited

U.S. PATENT DOCUMENTS

| | | | |
|---|---|---|---|
| 6,987,949 B2 * | 1/2006 | Taniguchi et al. | 455/62 |
| 7,376,697 B2 * | 5/2008 | Koskimies | 709/203 |
| 2002/0006793 A1 * | 1/2002 | Kun-Szabo et al. | 455/426 |
| 2002/0036991 A1 * | 3/2002 | Inoue | 370/328 |
| 2005/0085279 A1 * | 4/2005 | Aoki | 455/574 |
| 2005/0286493 A1 * | 12/2005 | Angelhag | 370/352 |
| 2006/0080380 A1 * | 4/2006 | Aizu et al. | 709/203 |

FOREIGN PATENT DOCUMENTS

| | | |
|---|---|---|
| JP | A-2000-115242 | 4/2000 |
| WO | WO 00/41376 | 7/2000 |

OTHER PUBLICATIONS

Harry Newton, Newton's Telecom Dictionary, Feb. 2002,CMP books, 18th edition, p. 504.*
ISO/IEC International Standard 18092, 1st Edition Apr. 1, 2004.
IEEE Standard for 802.15.4-2003.
U.S. Appl. No. 10/929,793 Method of Communication and Base Station pp. 1-42 and pp. 1-18 NITT.0232.

* cited by examiner

*Primary Examiner*—Jason E Mattis
*Assistant Examiner*—Kibrom T Hailu
(74) *Attorney, Agent, or Firm*—Antonelli, Terry, Stout & Kraus, LLP.

(57) ABSTRACT

In a wireless communication system, a utilization of a global ID having a long bit length, which is useful for linking with an external system, is compatible with a reduction of a communication amount of a wireless terminal. The wireless terminal transmits the global ID only when the wireless terminal is initially registered, and after a local ID having a short bit length is allocated by a server to the wireless terminal, this wireless terminal uses one the local ID. While the server manages a corresponding relationship between the global ID and the local ID, the server uses the global ID in order to identify the wireless terminal in a communication made outside the system.

13 Claims, 18 Drawing Sheets

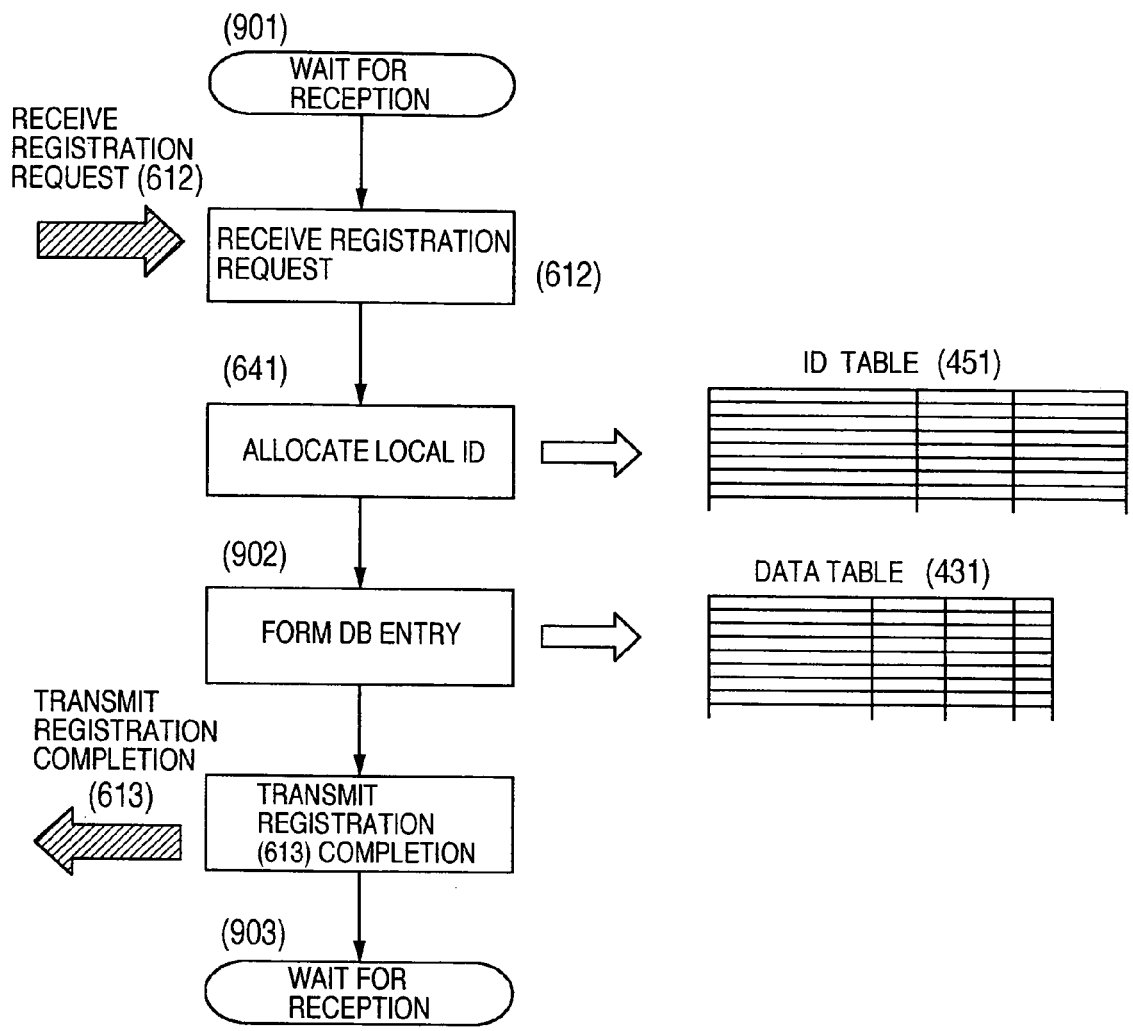

FIG.11

| FIELD TYPE | SIZE | USAGE |
|---|---|---|
| Frame Length | 8 bit | OCTET LENGTH OF RF-MAC PAYLOAD PORTION |
| Message Type | 4 bit | TYPE OF MESSAGE |
| Local ID | 8 bit | LOCAL ID OF SENSOR CHIP |
| Sequence Number | 8 bit | SERIAL NUMBER OF MESSAGE SEQUENCE |
| Data | VARIABLE | CONTROL INFORMATION, INFORMATION OF RF-APL |
| FCS | 8 bit | ERROR DETECTION OF ENTIRE FRAME |

(1111) Frame Length
(1112) Message Type
(1113) Local ID
(1114) Sequence Number
(1115) Data
(1116) FCS

TYPE

| FIELD VALUES (MEANINGS) IN RESPECTIVE MESSAGES [SIZES] | | | |
|---|---|---|---|
| REGISTRATION REQUEST (611) | REGISTRATION COMPLETION (614) | MEASUREMENT DATA (1211) | CONFIRMATION RESPONSE (1214) |
| 0x12 (18 OCTETS) | 0x12 (18 OCTETS) | 0x07 (7 OCTETS) | 0x02 (2 OCTETS) |
| 0x1 (REGISTRATION REQUEST) | 0x2 (REGISTRATION COMPLETION) | 0x3 (MEASUREMENT DATA) | 0x4 (CONFIRMATION RESPONSE) |
| 0x00 (BEFORE ALLOCATION) | 0x5a (WHEN ALLOCATION IS MADE) | 0x5a (AFTER ALLOCATION) TYPE | 0x5a (AFTER ALLOCATION) |
| 0x01 (FIRST SEQUENCE) | 0x01 (FIRST SEQUENCE) | 0x02 (SECOND SEQUENCE) | 0x02 (SECOND SEQUENCE) |
| · GLOBAL ID [128 bit] | · GLOBAL ID [128 bit] | · SENSOR TYPE [8 bit]<br>· MEASUREMENT VALUE [16 bit]<br>· MEASURING TIME INSTANT [16 bit] | . |
| (CRC-8 VALUE) | (CRC-8 VALUE) | (CRC-8 VALUE) | (CRC-8 VALUE) |

```
(1801)   <?xml version = "1.0"  encoding = "UTF-8"?>

(1802)   <sensornet-service  version = "1.0">

(1803)   <date>Mon Jul 12 10:25:11.73 JST 2004</date>
(1804)   <source-agent>monitoring-center.corp-a.com</source-agent>
(1805)   <destination-agent>factory-1.corp-a.com</destination-agent>

(1806)   <message type = "query">
(1807)       <id>60852828.monitoring-center.corp-a.com</id>

(1808)       <output>
(1809)           <list>
(1810)               <value>sensor-chip ID</value>
(1811)           </list>
(1812)       </output>

(1813)       <condition>
(1814)           <sensor-chip>
(1815)               <location>welding room</location>
(1816)               <sensor>
(1817)                   <type>temperature</type>
(1818)                   <measured-data>
(1819)                       <period>today</period>
(1820)                       <expression>
(1821)                           <operator>higher equal</operator>
(1822)                           <value>28.0</value>
(1823)                           <unit>celsius</unit>
(1824)                       </expression>
(1825)                   </measured-data>
(1826)               </sensor>
(1827)           </sensor-chip>
(1828)       </condition>

(1829)   </message>
(1830)   </sensornet-service>
```

FIG.19

```
(1801)  <?xml version = "1.0"  encoding = "UTF-8"?>

(1802)  <sensornet-service  version = "1.0">

(1803)  <date> Mon Jul 12 10:25:12.36 JST 2004 </date>
(1804)  <source-agent> factory-1.corp-a.com </source-agent>
(1805)  <destination-agent> monitoring-center.corp-a.com </destination-agent>

(1806)  <message type = "answer">
(1807)      <id> 81371609.factory-1.corp-a.com </id>
(1808)      <original-message-id>
(1809)          60852828.monitoring-center.corp-a.com
(1810)      </original-message-id>
(1811)      <status> success </status>

(1812)      <output>
(1813)          <list>
(1814)              <value> e20b:23c1:03d0:5f89:5604:5e5d:c20c:008b </value>
(1815)              <value> 8911:8b40:0489:4104:eb31:8b55:088b:0256 </value>
(1816)              <value> cle7:0b03:f889:3e8b:4204:8bd0:clea:0ecl </value>
(1817)          </list>
(1818)      </output>
(1819)  </message>

(1820)  </sensornet-service>
```

FIG.20

ID TABLE (451)

| | GLOBAL ID (hex) | COMMUNICATION COST | LOCAL ID (binary) | INDEX TO DB |
|---|---|---|---|---|
| (101) | 8b75:0c57:8bf8:clef:0eb9:ff3f:0000:23cl | 7.6 | 100 | Index_100 |
| (102) | e20b:23cl:03d0:5f89:5604:5e5d:c20c:008b | 6.2 | 11111000 | Index_11111000 |
| (103) | 4424:0453:8b5c:240c:5657:6a05:598b:f88b | 8.1 | 0 | Index_0 |
| (104) | f3f3:a58b:7c24:188b:f781:c7ff:3f00:008b | 7.9 | 101 | Index_101 |
| (105) | 8bec:837d:100f:7412:8b45:088b:108b:4d0c | 6.6 | 111100 | Index_111100 |
| (106) | 8911:8b40:0489:4104:eb31:8b55:088b:0256 | 7.4 | 110 | Index_110 |
| (107) | cle7:0b03:f889:3e8b:4204:8bd0:clea:0ecl | 7.2 | 1110 | Index_1110 |
| (108) | 50e8:1eff:ffff:8b43:0c03:c703:c650:8b44 | 6.8 | 111101 | Index_111101 |

FIG.21

$$Cost = K \cdot \frac{W \times L \times F}{Cap}$$

| SYMBOL | MEANINGS |
|---|---|
| Cost | COMMUNICATION COST [ l / s ] |
| K | NORMALIZING COEFFICIENT |
| Cap | POWER SUPPLY CAPACITY [ W / h ] |
| W | ELECTRIC POWER REQUIRED TO TRANSMIT/RECEIVE 1 BIT [ W · h / bit ] |
| L | BIT LENGTH OF 1 FRAME [ bit ] |
| F | TRANSMISSION/RECEPTION FREQUENCY [ l / s ] |

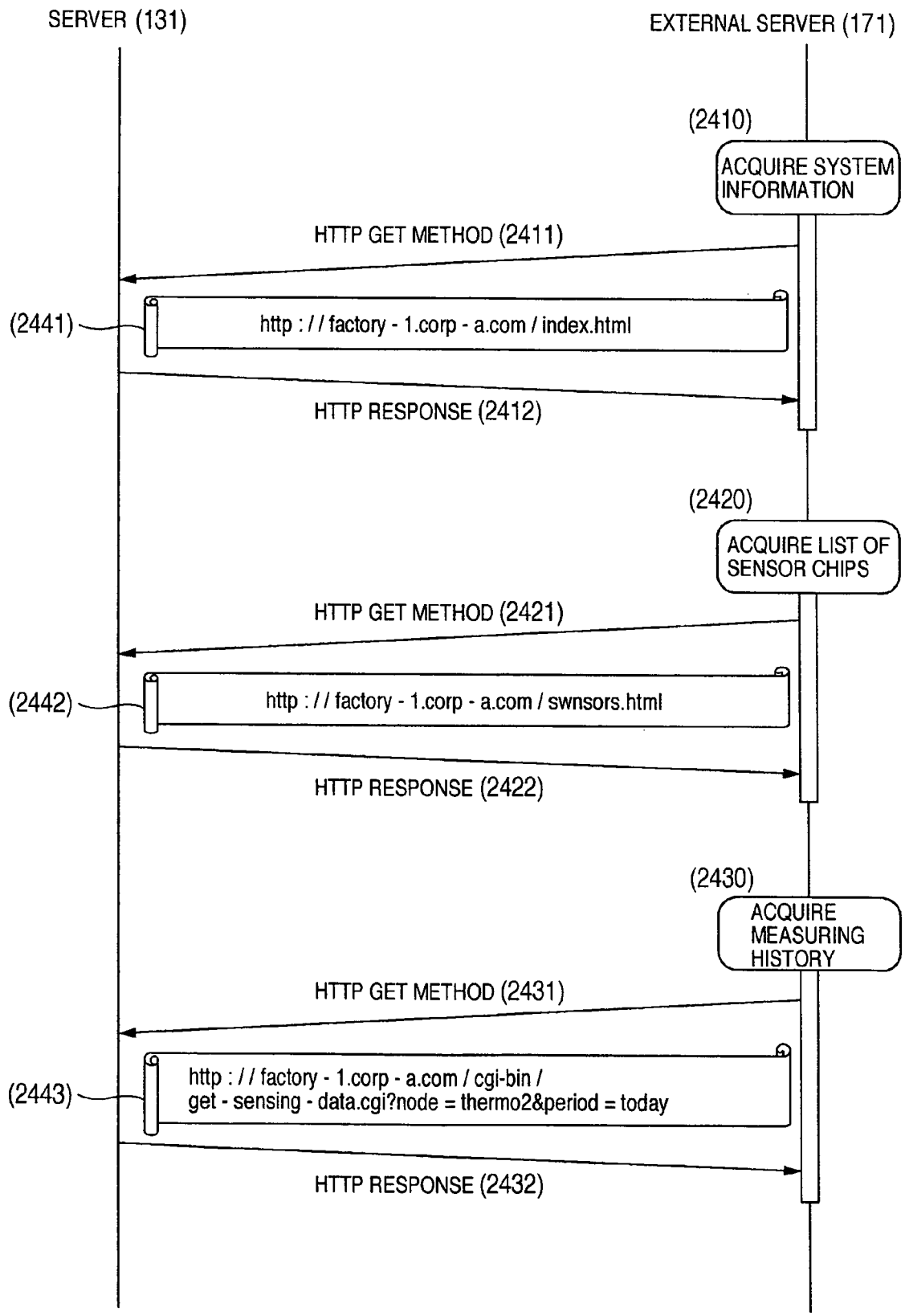

WIRELESS COMMUNICATION SYSTEM

INCORPORATION BY REFERENCE

The present application claims priority from Japanese application JP 2004-240245 filed on Aug. 20, 2004, the content of which is hereby incorporated by reference into this application.

BACKGROUND OF THE INVENTION

1. Field of the Invention

The present invention generally relates to a communication system containing wireless communication terminals and wireless base stations. More specifically, the present invention is directed to such a sensor network system that the above-described wireless communication terminals correspond to compact semiconductor chips on which sensors have been mounted.

2. Description of the Related Art

Research capable of realizing ubiquitous society where all of subjects can be connected via networks to each other has been actively developed. Compact-sized IC chips having wireless communication functions known as non-contact IC cards and RFIDs have been rapidly popularized. These compact-sized IC chips have been widely utilized in various application fields such as product distribution managements, production managements, and electronic money systems. Also, since various sorts of sensor functions are mounted on such IC chips, such trials as to monitoring of production lines, home security, and environmental measurements may be realized. Networks and services which are constructed of such sensor chips (IC chips equipped with sensors) are referred to as "sensor networks", while "sensor networks" can be expected as techniques capable of acquiring real-time information of actual fields into networks, and capable of establishing information basis of ubiquitous society.

As the technical specifications related to the near distance wireless communications of the non-contact IC cards which have been widely used, the international standard specification of ISO/IEL IS 18092 has been defined.

Presently available sensor networks are still under developing and applying stages where various researching institutes and various makers are developing prototype networks and products which are exclusively and independently designed for these owners. Since these sensor chips have been designed based upon the specific individual communication specifications thereof, there is no compatibility as to a physical layer and other layers higher than, or equal to a MAC layer. In most products, local IDs having shorter bit lengths (for instance, 8 bits and 16 bits) are employed so as to identify the respective sensor chips from each other. The exclusive characteristics of these local IDs are guaranteed only in the relative maker, or only in a specific system. As a result, such sensor chips which are manufactured by different makers cannot be communicated with each other. Otherwise, even when sensor chips are manufactured by the same maker, there are some cases that such sensor chips delivered to different users cannot be communicated with each other. Up to now, since sensor networks have not yet been constructed in a large scale, there is substantially no serious problem. However, in a near future, such a technical idea may be probably expected while sensor network systems will be widely utilized and various sorts of technical specifications are desirably standardized. That is, sensor chips which are purchased from a plurality of makers may be commonly used within the same system, and systems which have been separately established may be linked to each other. In order to realize these expectations, general-purpose architecture is necessarily required which is capable of acquiring data sensed by sensor chips, while this architecture does not depend upon a technical specification provided by a specific maker.

In non-contact IC card fields and RFID fields, in order to exclusively identify each chip from these chips, there is such a move that global IDs having exclusive characteristics in the world are being established. For instance, "Ubiquitous ID" having 128 bits has been proposed from the ubiquitous center of the Japanese business groups, whereas "EPC (Electronic Product Code)" having either 64 bits or 96 bits has been proposed from the EPC global of US business groups. These moves will also be applied to sensor networks, and IDs having exclusive characteristic in the world will be necessarily applied to respective sensor chips in near future.

Generally speaking, a passive power supplying system is known as a popular power supplying system in non-contact IC cards and RFIDs, in which electromagnetic waves radiated from readers are used as energy sources so as to operate these cards. On the other hand, since sensor chips for constituting sensor networks are arranged in a wide area, and perform sensing operations and data transmission in an autonomous manner, such an active power supplying system is known as a general-purpose power supplying system in which batteries, or power generating apparatus are built in the sensor chips. Concretely speaking, this active power supplying system employs a primary battery (dry battery), a secondary battery (rechargeable battery), a fuel cell, solar light power generating apparatus, very small vibration power generating apparatus, and the like.

When the following installation ideas may be conceived in which sensor chips are attached to persons and articles and a large number of sensor chips are distributed in an environment, these sensor chips must be made as small as possible. In order to make sensor chips compact, active power supplying apparatus thereof must be made compact. However, this implies reductions of power supply capacities. On the other hand, the respective sensor chips must be driven for long time in order to improve practical utilizations. As a consequence, power consumption of these sensor chips must be necessarily lowered.

The most portion of the power consumption by these sensor chips is consumed in wireless communications, for instance, more than 90% of entire power is consumed. Therefore, in order to reduce power consumption of these sensor chips, wireless communications must be carried out in low power consumption. As one of power reducing aspects, reductions of a total amount of data to be transmitted/received may become important. As previously explained, such an idea for applying global IDs having exclusive characteristics in the world even to these sensor chips may be necessarily expected. Under this condition, bit lengths of measurement data which are wanted to be transmitted typically become several tens of bits. If the global IDs having the long bit lengths are directly used under this environment, then actual communication amounts may be unnecessarily increased, as compared with communication amounts of data.

For instance, in such a case that a global ID having 128 bits is directly used in a header of a data packet during communication operation, if a protocol designates both a transmission source and a transmission destination, then overhead of 256 bits is produced only by employing this protocol. On the other hand, sizes of measurement data may be determined based upon sorts of sensors and measuring objects. When use of temperature data is conceived, a typical bit length of this temperature data may become 16 bits, or 32 bits in maximum.

In such usage that real-time characteristics are required to some extent, sensor chips are required to transmit measurement data every time a measuring operation is performed one time. At this time, it is ineffective to give the overhead of 256 bits to the transmission of the measurement data. In conventional wire type communications and conventional wireless type communications, such an overhead never causes a serious problem, while the conventional wireless type communications are established under such an initial condition that there is a relatively large margin in electric power, e.g., wireless LANs and Bluetooth®. However, in sensor chips established under such an initial condition that wireless communications are carried out in low speeds and low power consumption, overhead having 200 bits, or more bits per 1 packet may give seriously adverse influences to communication performance.

As previously explained, among the local IDs which have been employed in the conventional sensor chips, these local IDs merely own the exclusive characteristics only in the relevant maker, or in the relevant sensor chip system. In communications made outside systems, there is no general-purpose method capable of exclusively specifying individual sensor chips from each other. On the other hand, in such a case that the global IDs which are expected to become essential in future are directly employed so as to perform a wireless communication, a ratio of overhead occupied in communication data of sensor chips is increased, so that communication ranges and power consumption are wasted.

SUMMARY OF THE INVENTION

An object of the present invention is to provide a wireless communication system by which a reduction of a communication amount for lowering power consumption of a sensor chip is compatible with an effective utilization as to the global IDs which own merits in links with an external system.

To achieve the above-described object, a wireless communication system, according to an aspect of the present invention, is featured by that a sensor chip containing a global ID having an exclusive characteristic in the world transmits this global ID to a server in an initial communication; the server allocates one piece of the local ID having the exclusive characteristic only in the system with respect to the global ID received from the wireless terminal, and then, transmits the allocated local ID to the sensor chip; the sensor chip stores thereinto the local ID received from the server; and in the subsequent communication, any of the sensor chip, a wireless base station, and the server use the local ID so as to identify the sensor chip. The wireless base station repeats a communication between the sensor chip and the server. As a concrete communication method, in a communication after the local ID has been allocated, such an information which does not contain the global ID, but contains the local ID is transmitted/received.

It should be noted that in order to allocate local IDs, these local IDs are not always produced one by one to be allocated. For example, when the server is initiated, a plurality of local IDs are produced and then are held in a ID pool. Every time a request is received from a sensor chip, the server may allocate one piece of the local ID from the ID pool. As a simple example, while the ID pool of these local IDs are managed based upon a stack type data structure, the server sequentially pushes local IDs from a head every time a request is received.

Also, the wireless communication system of the present invention is featured by that while the server is communicated with an external communication apparatus via a broadband network, the server uses the global ID when the wireless terminal is identified in the communication with the external communication apparatus; and the server mutually converts the local ID and the global ID with each other when the server repeats the communication with the external communication apparatus to either the sensor chip or the wireless base station.

Among the conventional techniques resembled to the inventive idea of the present invention at a glance, the NAT (Network Address Translator, or Network Address Translation) technique has been proposed which performs conversions of IP (Internet Protocol) addresses. However, this NAT technique is featured as follows: That is, with respect to a terminal which has only a local address, but does not own a global address, an NAT apparatus makes up a corresponding relationship between the local address and a specific global address within only the own NAT apparatus. When an IP packet is transferred, the NAT apparatus mutually converts both the local address and the specific global address with each other. As a consequence, the above-described terminal which is connected under management by the NAT apparatus cannot become aware of the global address which has been allocated to the own terminal, but may perform a communication with employment of only the local address from the beginning. As apparent from the foregoing descriptions, it is obvious that the present invention owns a plurality of technical features which are completely different from the conventional NAT technique.

When the features of the present invention are summarized, a communication system corresponds to such a communication system comprising a plurality of terminals, and one, or more base stations. In this communication system, the terminal includes: communication means for communicating with the base station; a first memory for storing thereinto a first ID which exclusively identifies a terminal; and a second memory for storing thereinto a second ID corresponding to the first ID. Also, the base station includes: communication means for communicating with the terminal; and the terminal transmits the first ID to the base station, receives the second ID corresponding to the first ID from the base station, stores the received second ID into the memory, and uses the second ID in the subsequent communication. The terminal is arranged, by, for example, a chip equipped with various sorts of sensors. A communication between the terminal and the base station is preferably carried out in a wireless manner. The second ID is produced by a server, or the like, which is connected to the base station. The server may alternatively produce a second ID based upon the first ID received via the base station, and this second ID may be alternatively transmitted via the base station to the terminal. The server may alternatively a second ID having a shorter bit length than the bit length of the first ID, which corresponds to the first ID in one-to-one correspondence, and stores thereinto a corresponding relationship between the first ID and the second ID.

A communication method of the present invention corresponds to such a communication method in a communication system comprising a plurality of terminals, and one, or more base stations which are communicated with the terminals in a wireless manner.

The terminal transmits a first ID for specifying the own terminal to the base station, receives a second ID corresponding to the first ID from the base station, and stores thereinto the second ID. In a communication after the second ID has been stored, both the terminal and the base station use the second ID in order to identify the terminal. Such an allocation of the second ID may be carried out just after the terminal is installed, for example, when the communication system is initialized.

A wireless terminal of the present invention corresponds to such a wireless terminal for communicating with a base station in a wireless manner. The wireless terminal includes: a wireless module for communicating with the base station; a first memory for storing thereinto a first ID; a second rewritable memory; a controller for controlling the wireless module, the first memory, and the second rewritable memory; and a power supply for supplying electric power to the wireless module, the first and second memories, and also, the controller. In this case, the controller transmits data containing the first ID via the wireless module to the base station; when a second ID corresponding to the first ID transmitted from the base station (or via base station) is received by the wireless module, the controller controls that the received second ID is stored in the second memory, and a communication is performed by using the second ID. The functions of such a controller may be realized by software executed on a microprocessor, and in addition, may be realized by employing exclusively-used hardware.

In a communication after the second ID has been stored in the second memory, the controller controls that the controller is communicated with the base station by employing the second ID. If the second ID owns a shorter bit length than the bit length of the first D, then a total amount of data (containing ID) which is communicated may be reduced. When a battery is employed as the power supply, a lifetime of this battery may be prolonged.

A server of the present invention corresponds to such a server which is connected to a communication system comprising: a plurality of terminals, and one, or more base stations which are communicated with the terminals in a wireless manner. This server includes: a communication unit for communicating with the base station; a memory; and a controller for controlling both the communication unit and the memory. The controller controls that when a first ID transmitted via the base station from the terminal is received by the communication unit, the controller produces a second ID having a shorter bit length than a bit length of the first ID in correspondence with the first ID in an one-to-one correspondence; the controller stores the produced second ID into the memory; and the controller transmits the second ID to the terminal by using the communication unit.

In accordance with the present invention, in the communication made inside the system, especially, in the wireless communication, such a local ID having the shorter bit length can be used which is suitable for low electric power/low-speed communications. Also, since the server intermediates the communication with the external apparatus outside the system, the server can also utilize the global ID having the exclusive characteristic in the world, which can be suitably linked to the external system.

Also, since the global ID does not directly give adverse influences to the communication specification defined within the system, the wireless communication system can easily accept changes in the technical specification of the global ID.

BRIEF DESCRIPTION OF THE DRAWINGS

FIG. 9 indicates an operation flow of the server when the sensor chip is initially registered in the sensor network system of FIG. 1.

FIG. 10 indicates a structure of an ID table managed by the server of the sensor network system shown in FIG. 1.

FIG. 11 represents a structure of a wireless frame which is used in a communication between the sensor chip and the wireless base station in the sensor network system of FIG. 1.

FIG. 18 shows a format of an XML-APL layer in the query 1511 of FIG. 16.

FIG. 19 shows a format of an XML-APL layer in the answer 1512 of FIG. 16.

FIG. 20 indicates a structure of an ID table managed by a server employed in a sensor network system according to an embodiment 2 of the present invention.

FIG. 21 explanatorily indicates a calculation formula as to communication cost used in the sensor network system of the embodiment 2.

FIG. 24 represents an example of a communication sequence when a server communicates with an external server outside of a sensor network system according to an embodiment 4 of the present invention.

DETAILED DESCRIPTION OF THE EMBODIMENTS

In a large-scaled production line of factories which must be operated in automatic and unmanned manners, a large number of sensor chips are arranged so as to monitor manufacturing steps. While these factories have been distributed in all sites within a country, sensor network systems have been constructed in the respective factories. Since all of these sensor network systems are monitored via the Internet by a central managing center, the manufacturing steps can be monitored in an unified manner, which can constitute an information base capable of progressing various measures so as to improve productivity.

Embodiment 1

Figure 1:
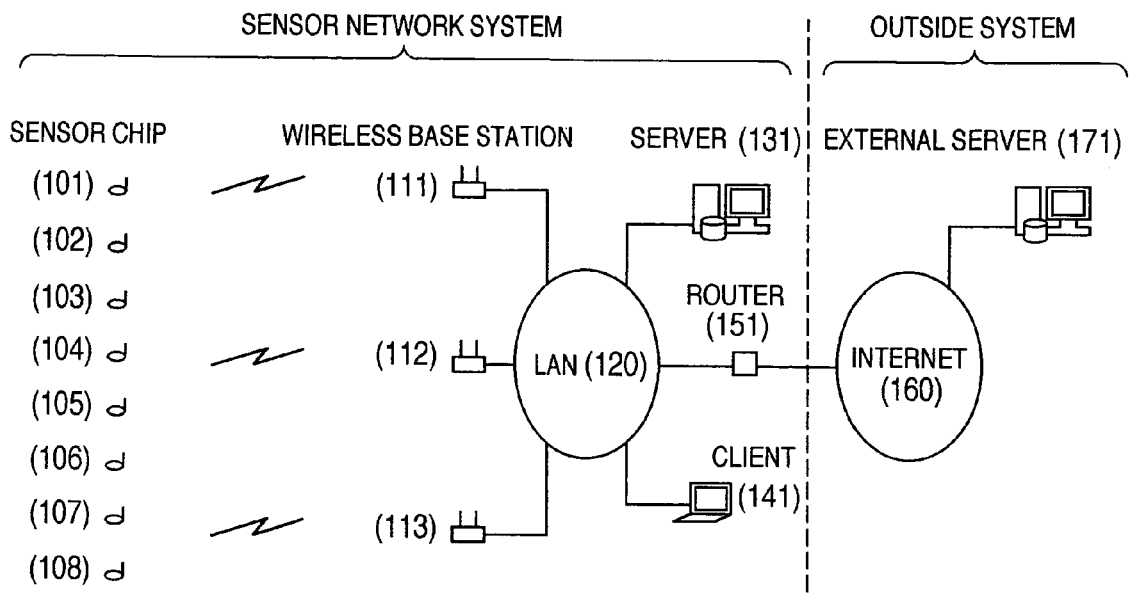
FIG. 1 is a schematic diagram for illustratively showing a connection relationship among structural appliances of a sensor network system functioning as a wireless communication system according to an embodiment 1 of the present invention.

FIG. 1 schematically shows an entire arrangement of a sensor network system containing an external system, according to an embodiment 1 of the present invention. In this sensor network system, sensor chips 101 to 108 correspond to compact IC (Integrated Circuit) chips equipped with sensor functions and wireless communication functions. A large number of sensor chips may be attached to persons and articles, or may be arranged in environments. Each of these sensor chips 101 to 108 performs a sensing operation and also transmits data in a periodic manner.

In the sensor network system of FIG. 1, wireless base stations 111 to 113 play such a role that the wireless base stations 111 to 113 receive data transmitted from the sensor chips 101 to 108, and then, transfer the received data to a server 131. Generally speaking, a total number of wireless base stations is smaller than a total number of sensor chips. While each of the wireless base stations 111 to 113 has the own communicable area, these wireless base stations 111 to 113 are arranged in such a manner that these wireless base stations 111 to 113 may cover an entire area where these sensor chips 101 to 108 are arranged. Since wireless communications are easily and adversely influenced by noise, there are some cases that wireless base stations are arranged in a dense manner in order that one sensor chip is capable of continuously communicating with a plurality of wireless base stations. Alternatively, there are other cases that sensor chips perform multi-hop communications, and wireless base stations need not be arranged in a dense manner.

In the sensor network system of FIG. 1, a server 131 receives measurement data via a LAN 120, which has been transmitted from a sensor chip and has been received by a wireless base station. The server 131 stores measurement data acquired from the individual sensor chips 101 to 108 into a database. Also, this server 131 accepts an access issued from a client 141, and an access issued from an external server 171. Then, the server 131 provides information of the database, and conversely, receives provisions of information with respect to these client 141 and external server 171.

The client 141 provides an interface with a user in this sensor network system. This client 141 becomes a front end capable of realizing an application program such as, for instance, a temperature monitoring operation, and accesses the server 131 so as to acquire information of the database, and then, displays a temperature monitoring screen. Also, the client 141 accepts a management command issued from a user, and executes control operations with respect to a server, a wireless base station, and a sensor chip. Since such an electronic appliance which is directly communicated by the client 141 corresponds to the server 131, the management command with respect to the wireless base station and the sensor chip is firstly accepted by the server 131, and then, the management command is transferred from the server 131 to the wireless base station and further to the sensor chip. It should be understood that since the above-described client 141 has no direct relationship with contents of the present invention, a detailed description as to this client 141 is not made in the present specification.

The LAN 120 corresponds to a local area network which has been established on the user side. As technical ideas for constituting LANs, Ethernet® techniques have been widely popularized, and LANs are constituted by switching hubs, wireless LAN access points, and the like. Also, these LAN technical ideas may be combined with other communication techniques directed to LANs such as Bluetooth®, ECHO-NET®, and HAVi®. While the wireless base stations 111 to 113, the server 131, the client 141, and the like are connected to this LAN 120, the LAN 120 intermediates in communications among these apparatus.

In the sensor network system of FIG. 1, a router 151 corresponds to a gateway used for connecting the LAN 120 to the Internet 160 which may constitute a world wide public network. While a basic function of a router is IP routing and forwarding of an IP packet, since such routers equipped with various sorts of gateway functions are commercially available, these gateway functions may be utilized in accordance with requirements. For example, a DHCP function used to automatically allocate IP addresses to the respective apparatus provided in the LAN 120 may be utilized, and an NAT (Network Address Translation) function in the case that private IP addresses are used in the LAN 120 may be utilized. In particular, in order to avoid an illegal access from an external source via the Internet 160 into the LAN 120, the router 151 is suitably equipped with a firewall function. In this case, the server 131 may be alternatively connected to the LAN 120 in a similar way as another appliance as indicated in this drawing, or the server 131 may be alternatively connected to a specific port of a router in order to further strengthen security, so that DMZ (De-Militarized Zone) may be alternatively constructed.

The above-described appliances are the arrangement of the sensor network system which has been constituted on the user side. In this specification, an expression "user" may imply any of individuals, enterprises, governmental offices, and the like.

The above-described sensor network system is connected via the router 151 to the Internet 160. As an access line for connecting the router 151 to the Internet 160, various sorts of lines may be used which are provided by access providers. Typically, analog telephone lines, digital leased lines, ADSL, CATV, FTTH may be used. In such a case that a user of this sensor network system is an individual, or a small-scaled enterprise, an access line is firstly stored in a network of ISP (Internet Service Provider), and then, the IPS network is connected to the Internet 160 in a typical case.

As viewed from the sensor network system, the external server 171 corresponds to an external communication appliance existed on the Internet 160. This external server 171 may correspond to an ASP (Application Service Provider) which provides a specific application program on the payment base, or may correspond to a Web site opened on the free charge base. Although actual connections of the external server 171 to the Internet 160 are different from each other, depending upon enterprising entities having the external server 171, generally speaking, the external server 171 is connected via a network of ISP to the Internet 160.

It should be understood that a relationship between a sensor network system and an external server is not always made in an one-to-one relationship. For instance, a single set of an external server may be alternatively communicated with a plurality of sensor network systems, and a single set of a sensor network system may be alternatively communicated with a plurality of external servers. Otherwise, the external server 171 may correspond to a server employed in another sensor network system different from that of FIG. 1. In this alternative case, separately provided sensor network systems may be communicated with each other.

Figure 2:
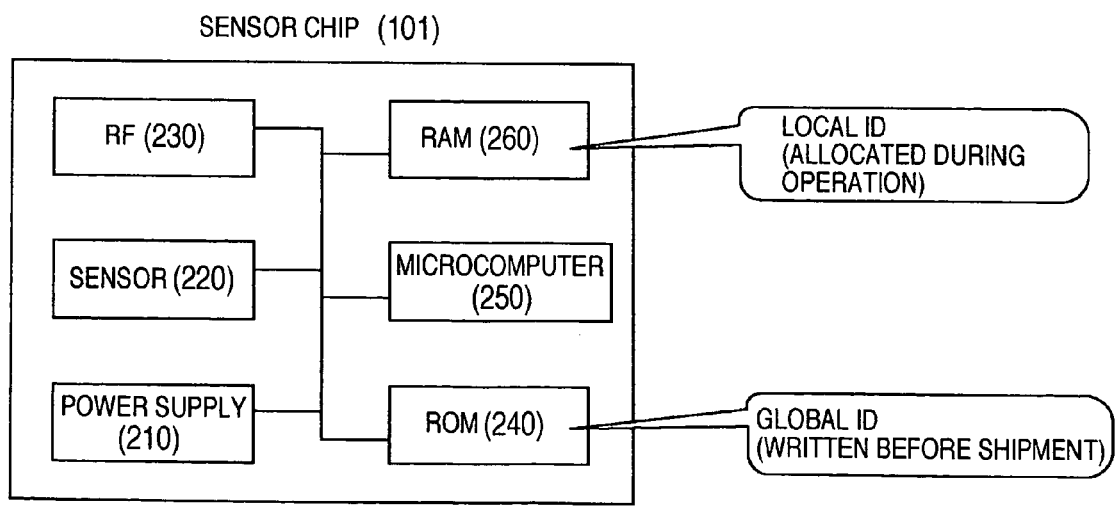
FIG. 2 is a block diagram for showing an internal structure of a sensor chip employed in the sensor network system of FIG. 1.

FIG. 2 schematically shows an internal structure of the sensor chip 101. A power supply 210 supplies electric power which is used so as to operate respective function units of this sensor chip 101. As the power supply 210, a primary battery (dry battery, button type battery etc.), a secondary battery (rechargeable battery), a fuel cell, a solar cell, a very small vibrating power generating apparatus, and the like may be utilized.

In the sensor chip 101, a sensor 220 performs a sensing operation in response to a measuring instruction issued from a microcomputer 250, and then, transfers a measurement value to the microcomputer 250. Physical quantities which may become objects to be measured correspond to a temperature, pressure, an acceleration, an infrared ray amount, an electric potential, and the like. The sensor 220 is provided with an accepting mechanism which is suitable for an object to be measured. In the case that a primary measurement value is obtained as an analog signal, the sensor 220 is equipped with an A/D converter for converting this analog signal into such a digital value which may be handled by the microcomputer 250. Alternatively, in order that the sensor chip 101 may be applied to various sorts of application fields, the sensor 220 may be equipped with a plurality of accepting mechanisms, and/or a plurality of such sensors having different accepting mechanisms may be mounted, depending upon sensing purposes.

In the sensor chip 101, an RF 230 is arranged by an antenna and an radio frequency circuit. The RF 230 transmits and/or receives data between the own sensor chip 101 and a wireless base station, or another sensor chip. Depending upon wireless frequency bands and wireless modulating methods, which are used in communications, implementation techniques which should be employed in the antenna and the radio frequency circuit are different from each other.

In a ROM 240 of the sensor chip 101, a program code and various sorts of parameters containing a global ID have been written. When the sensor chip 101 is initiated, the microcomputer 250 reads out the program code from the ROM 240 so as to execute the read program code. Alternatively, the program code may contain an OS (Operating System). In the case that the storage contents of the ROM 240 may be probably rewritten after the sensor chip 101 has been shipped, for instance, in case of a version upgrade as to the program code and a change in the parameters, such a mounting technique as a flash memory may be utilized. It should be noted that as to a value of a global ID, a manufacturer writes fixed values into respective sensor chips before these sensor chips are shipped. Therefore, under the normal operation, such an opportunity that values of global IDs are rewritten after shipments is not expected.

The microcomputer 250 executes the program code so as to control overall operations of the sensor chip 101. Since the microcomputer 250 transmits and/or receives data with respect to not only the ROM 240 and a RAM 260, but also the sensor 220 and the RF 230, input/output interfaces between these function units and the microcomputer 250 are provided. Also, the microcomputer 250 is equipped with an interrupt function, a timer function, and the like. The interrupt function is employed in order to acquire data from the sensor 220 and the RF 230 in an event-driven manner. The timer function is employed so as to perform sensing operations in a periodic manner, so as to record measuring time instants, and so as to perform the data retransmitting control when data is transmitted. As to implementation techniques of the microcomputer 250, general-purpose 8-bit microcomputers may be used which are designed for embedded devices. Alternatively, custom-designed microcomputers may be employed, both the low power consumption characteristics and the signal processing functions of which have been improved for sensor networks.

The RAM 260 constitutes a work storage when the sensor chip 101 is operated. In such a case that the program code written in the ROM 240 contains an OS (Operating System), the OS and an execution process operated on the OS are loaded on the RAM 260. In the case that a program code does not contain an OS, the program code is not loaded on the RAM 260, but is directly read in the microcomputer 250 so as to be executed every one command. While the sensor chip 101 is operated, the RAM 260 may constitute such a storage region which holds a measurement value acquired from the sensor 220, and which generates and also analyzes a packet when data is transmitted and/or received. In particular, a local ID which is allocated from a server when the sensor chip 101 is initially registered is stored in the storage region of the RAM 260, and this stored local ID is used when measurement data is transmitted and/or received every time, which is related to the present invention.

Figure 3:
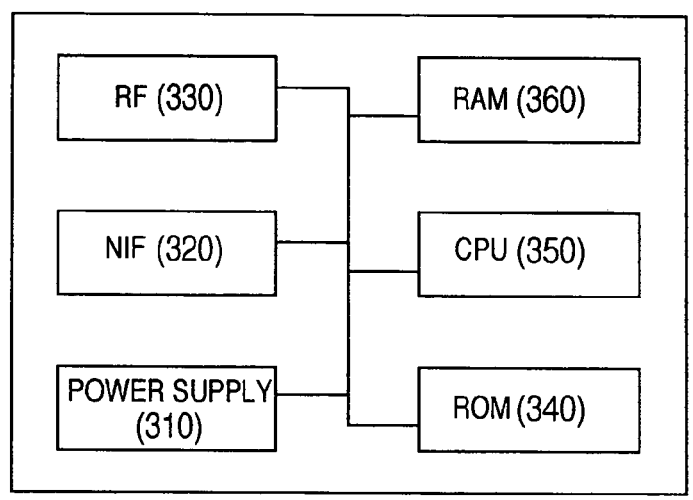
FIG. 3 is a block diagram for showing an internal arrangement of a wireless base station employed in the sensor network system of FIG. 1.

FIG. 3 schematically shows an internal arrangement of the above-explained wireless base station 111. In this wireless base station 111, a power supply 310 supplies electric power used to operate the respective function units of the wireless base station 111. The most standard power supplying method is such a method that while the power supply 310 is connected to a usual home-use power supply, electric power is supplied from an external power source. Alternatively, such a technique, such as PoE (Power over Ethernet®) and USB, may be employed in which a wire type communication cable is used as an electric power line. In this case, an NIF 320 also plays a role of the power supply unit. Alternatively, similar to the power supply of the sensor chip, either a battery or a power generating mechanism may be equipped with the wireless base station 111 so as to supply electric power in an internal manner.

The NIF 320 corresponds to a communication interface with respect to the LAN 120, and is communicated with the server 131. As a typical communication interface, there are 10/100BASE-T, a wireless LAN, Bluetooth®, and the like. As will be explained later, since IP (Internet Protocol) is used in a network layer in a communication between the NIF 320 and the server 131, an IP address is set to the NIF 320 and the NIF 320 is equipped with the transmission/reception function of the IP packet.

An RF 330 is arranged by an antenna and a radio frequency circuit. The RF 330 receives measurement data which is transmitted by a sensor chip, and transmits a response from the server 131 to a sensor chip. Since a limitation as to a dimension and electric power of a wireless base station is smaller than those of a sensor chip, a diversity technique using two or more antennas may be applied, and also, an interference reducing technique by executing a complex signal process operation may be applied. Further, a single wireless base station is communicated with a large number of sensor chips, so that higher performance than that of a sensor chip is required in this single wireless base station in order to perform a wireless multiplexing process, packet processing operation, and the like.

In the wireless base station 111, both a program code containing an OS and various sorts of parameters are written in a ROM 340. These program code and parameters are generally referred to as "firmware". While a technique capable of updating firmware in an online manner after shipment has been popularized, generally speaking, a flash memory whose content is rewritable is employed as a implementation technique of this ROM 340.

In the wireless base station 111, a CPU 350 executes the program code so as to control overall operations of the wireless base station 111. Since the CPU 350 transmits and/or receives data with respect to not only the ROM 340 and a RAM 360, but also the NIF 320 and the RF 330, input/output interfaces between these function units and the CPU 350 are provided. As to mounting techniques of the CPU 350, general-purpose 16-bit and 32-bit processors may be used which are designed for embedded devices. Alternatively, custom-designed processors may be employed, the signal processing functions of which have been improved.

In the wireless base station 111, the RAM 360 constitutes a work storage when the wireless base station 111 is operated. From the ROM 340, an OS and execution processes which is executed on the OS are loaded to this RAM 360. Also, the RAM 360 constitutes such an area for generating and analyzing a packet when data is transmitted and/or received.

Figure 4:
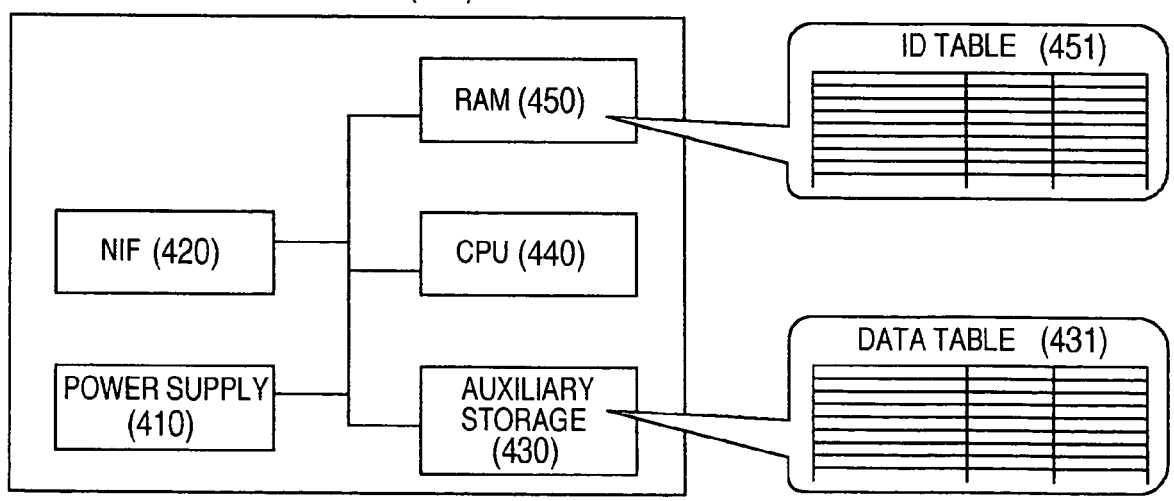
FIG. 4 is a block diagram for showing an internal arrangement of a server provided in the sensor network system of FIG. 1.

FIG. 4 schematically shows an internal arrangement of the above-described server 131. An architecture of this server 131 is similar to an architecture of a general-purpose PC (Personal Computer), and an architecture of an enterprise server.

In the server 131, a power supply 410 supplies electric power used to operate the respective function units of the server 131. A general-purpose power supplying method is such a method that while the power supply 410 is connected to a usual home-use power supply or a business-use power supply, electric power is supplied from an external power source. In particular, when the power supply 410 of the server 131 is applied to an enterprise purpose, an uninterruptible power supply (UPS) capable of accepting instantaneous power interruptions and power supply interruptions may be combined with this power supply 410.

An NIF 420 corresponds to a communication interface used to be connected to either the LAN 120 or the router 151, and is communicated with the wireless base stations 111 to 113, the client 141, and the external server 171. As a typical communication interface, there are 100BASE-TX, 1000BASE-T, 1000BASE-TX, and the like. If the communication interface 420 is used in such a field as a household field which is a small scale, and does not require high reliability, then an interface such as a wireless LAN may be alternatively employed. Since an IP (Internet Protocol) is used in a network layer in a communication made by the server 131, an IP address is set to the NIF 420 and the NIF 420 is equipped with the transmission/reception function of an IP packet.

In the server 131, both a program code containing an OS and various sorts of parameters are written in an auxiliary storage 430. Also, a data table 431 for managing measurement data acquired from the sensor chips 101 to 108 is held in the auxiliary storage 430, and also, a work storage area is allocated to the auxiliary storage 430 by way of a virtual memory function owned by the OS. As a packaging technique of the auxiliary storage 430, it is suitable to employ an HDD (Hard Disk Drive) with respect to a large-scaled sensor network system having a large number of sensor chips and a large data amount to be sensed. If a relatively small-scaled sensor network system is employed, then a flash memory having a storage capacity of several tens to several hundreds MB (Mega-Byte) may be alternatively employed.

A CPU 440 executes the program code so as to control an entire operation of the server 131. Also, the CPU 440 is equipped with an input/output interface which is used in order to transmit/receive data between the CPU 440 and the auxiliary storage 430, the RAM 450, the NIF 320. As an implementation technique of the CPU 440, a high-end high-speed processor may be employed for a business-purpose appliance, whereas a 16-bit processor and a 32-bit processor which are designed for embedded devices may be alternatively employed for a small-scaled appliance such as a usual household appliance.

A RAM 450 constitutes a work storage when the server 131 is operated. From the auxiliary storage 430, an OS and execution processes operated on the OS are loaded to the RAM 450. Also, since an access speed of the RAM 450 is higher than that of the auxiliary storage 430, such a data whose access frequency is high, and other data which must be accessed in high speed may be preferably stored in the RAM 450 as being permitted as possible until the storage capacity of this RAM 450 may allow to store these data. It should be understood that a content of an ID table 451 corresponding to one of the major structural elements according to the present invention is equal to one of the above-explained data.

Although not shown in this drawing, the server 131 may be alternatively equipped with a display unit for maintenance/management purposes, input/output devices such as a keyboard and a mouse, and interfaces to connect such input/output devices. Although a detailed explanation as to the external server 171 is not required in the specification of the present invention, it is conceivable that an arrangement of this external is similar to that of the server 131 shown in FIG. 4, as one example.

Figure 5:
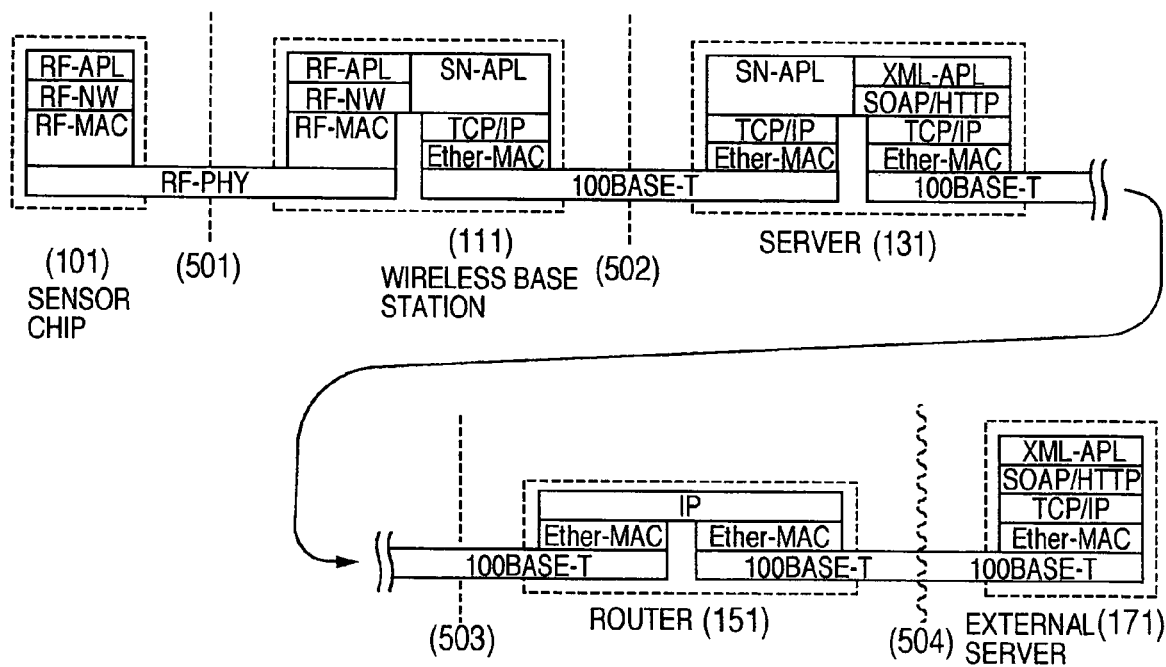
FIG. 5 illustratively indicates a protocol stack among the structural appliances of the sensor network system of FIG. 1.

FIG. 5 indicates protocol stacks of the respective unit employed in the sensor network system according to this embodiment 1. The protocol stack diagram represents a relationship as to protocol functions of the respective unit. The protocol stack diagram shows a logical connection relationship and how to link the respective protocol layers.

In the protocol stack of the sensor chip 101, an RF-APL layer encapsulates measurement data to a format used to be transmitted to a wireless base station. An RF-NW layer provides such functions capable of managing a global ID and a local ID, and capable of detecting a loss of a transmission/reception packet, and a duplicate reception. An RF-MAC layer provides such functions capable of defining a sort of a message, and capable of detecting an error of a frame. These respective layer functions are implemented as a program code which is executed by the microcomputer 250. A function of an RF-PHY layer is mounted in the RF 230, and this RF-PHY layer provides functions capable of encoding/decoding, multiplexing/demultiplexing, and modulating/demodulating frame data of a wireless signal transmitted on radio wave, and capable of transmitting/receiving a wireless signal transmitted on radio wave.

In this embodiment 1, both the global ID and the local ID are managed in the RF-NW layer. Alternatively, the global ID and the local ID may be managed in the RF-MAC layer, depending upon the implementating way. The above-explained description related to discussions of functions among the layers in the protocol stack may constitute a matter of implementing methods, so that even when any of implementing methods is carried out based upon any of these function sharing operations, no serious effect is given to the basic idea of the present invention.

The sensor chip 101 directly, or indirectly performs a wireless communication with at least one of the wireless base stations 111 to 113. For instance, in such a case that both the sensor chip 101 and the wireless base station 111 are located in the same communication area, both appliances are directly communicated with each other. In the case that the sensor chip 101 cannot be directly communicated with the wireless base station 111, a multi-hopping operation of data may be carried out between sensor chips located near this sensor chip 101, and finally, the data may be transferred to the wireless base station 111. In this alternative case, one, or more sensor chips are positioned at a place indicated by a dot line 501.

Also in the wireless base station 111, the function of the RF-PHY layer is implemented to the RF 330. Both the wireless-sided protocols higher than, or equal to the RF-MAC layer, and the LAN-sided protocols higher than, or equal to the TCP/IP layer are implemented as a program code executed by the CPU 350. Within the wireless-sided protocols, the respective functions of the RF-NW layer and the RF-APL layer are mapped to the SN-APL layer in the LAN-sided protocols. As a mapping result, although a conversion of a data format may be executed, the information such as the measurement data, the global ID, and the local ID is contained without dropout. In regard to the SN-APL layer, TCP/IP is employed for a transfer layer. UDP/IP may be alternatively employed, depending upon the implementing method. In this alternative case, both the detecting operations as to the packet loss and the duplicate reception, and the return control must be developed in its own way between the wireless base station 111 and the server 131. This process operation may be realized by the function of the RF-NW layer, which is mapped in the SN-APL layer. Both a function of an Ether-MAC layer and a function of a 100BASE-T layer are implemented to the NIF 320. Alternatively, one, or more routing unit may be provided between the wireless base station 111 and the server 131, while this routing unit constitutes such a LAN as a wireless LAN access point, a switching hub, and a router. This routing unit is located at a position indicated by a dot line 502 shown in this drawing.

The server 131 terminates an SN-APL layer which has been transferred on the TCP/IP. The measurement data from the respective sensor chips acquired by the SN-APL layer are stored in the data table 431. Since the SN-APL layer corresponds to a protocol used in a system in order to acquire data from sensor chips and to control the respective sensor chips, a more general-purpose protocol is employed in a communication between the server 131 and the external server 171. An XML-APL layer is equipped with a general-purpose characteristic, by which the server 131 can be linked to various sorts of systems, since an XML (Extensible Markup Language) is employed in a data format. In order to transfer the data format of the XML-APL layer to the Internet 160, both protocols of SOAP (Simple Object Access Protocol) and HTTP (Hyper Text Transfer Protocol) are utilized. Such a method of designing an application protocol with employment of XML and HTTP, and a service realized thereon are referred to as a "Web service". Such Web services have been actively utilized in electronic commercial transactions via the Internet, and in mutual links among various sorts of enterprises. Since frame works of XML/HTTP are employed in communications between the own server 131 and the external server 171, links with various sorts of service providers can be established.

The respective protocols higher than, or equal to the TCP/IP layer in the server 131 are implemented as program codes which are executed by the CPU 440. On the other hand, the respective protocols lower than, or equal to the Ether-MAC layer are implemented in the NIF 420. It should also be understood that in this drawing, such an observation may be made that as the network interface of the server 131, the network interface on the side of the wireless base station 111 and the network interface on the side of the router 151 are separately provided. However, this observation is caused by an expression problem of the protocol stack diagram, and therefore, this observation does not imply that the NIF 420 is equipped with two sets of physical interfaces. Since IP communications may be multiplexed on a single physical interface, even when the NIF 420 is equipped with only such a single physical interface, there is no problem as to the functions thereof. In the case that the NIF 420 is equipped with two physical interfaces, the following effects may be achieved, namely a communication band may be increased; a communication path may be acquired functional redundancy; and security may be easily designed.

Alternatively, one, or more routing unit may be provided between the router 151 and the server 131, while this routing unit constitutes such a LAN as a wireless LAN access point, a switching hub, and a router. This routing unit is located at a position indicated by a dot line 503 shown in this drawing. The router 151 relays a communication between the server 131 and the external server 171 in the IP layer. In other words, the router 151 determines an interface for forwarding based upon a destination IP address of each packet to be forwarded. Alternatively, the router 151 may perform such a process operation as NAT and packet filtering operation with respect to packets to be forwarded in response to a setting condition.

Generally speaking, a communication path between the router 151 and the external server 171 is routed via a plurality of routers and long-haul transmission units which constitute the Internet 160. Also, in the case that the router 151 or the external server 171 is installed within each network of respective enterprises and so forth, and in the case that an access of the router 151 or the external sensor 171 to the Internet 160 is made via a related ISP's network, a communication path is routed via gateways, routers, and switches, which constitute these networks. These various unit are located at positions indicated by a waving line 504. The external server 171 terminates the XML-APL layer from the server 131. Alternatively, the external server 171 may be linked to various sorts of servers such as database servers and application servers of a back-end, and further, other external servers which opens by other service providers in the Internet 100. Such various sorts of links may be easily realized by general-purpose characteristics owned by Web services.

In this drawing, the MAC layers and the PHY layers in communications within the LAN 120 and outside the system have been uniformly set as Ether-MAC and 100BASE-T. However, since various sorts of MAC layers and PHY layers are present in order to transfer IP layers, any one of these layers may be alternatively used. For instance, ADSL and an optical fiber may be employed as an access line for connecting the router 151 to the internet 160. Alternatively, within a network of a telecommunications carrier which constitutes the Internet 160, MPLS may be employed in an MAC layer, and OC-192 may be employed in a PHY layer.

It should be understood that since the operation of the client 141 does not constitute a major aspect of the present invention, as explanation as to the client 141 is not covered in this drawing. However, as one example, similar to the external server 171, such a implementation of the client 141 may be realized that the client 141 is communicated with the server 131 by employing XML-APL.

Figure 6:
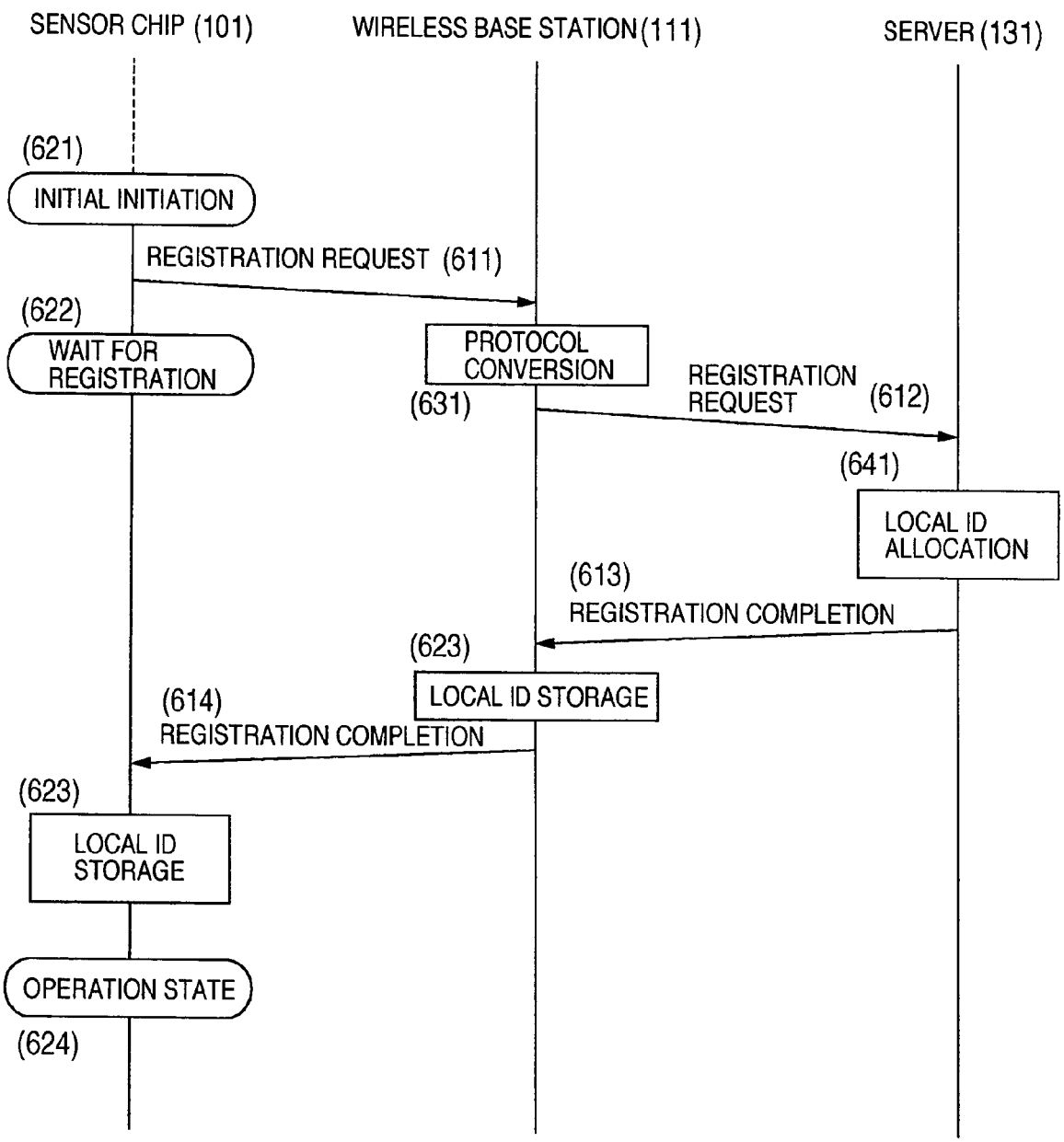
FIG. 6 indicates a communication sequence when a sensor chip is initially registered in the sensor network system of FIG. 1.

FIG. 6 represents a communication sequence when a sensor chip is initially registered. The sensor chip 101 transmits a registration request message 611 in an initial initiating state 621, and then, the operation of this sensor chip 101 is transited to a registration waiting state 622. The wireless base station 111 which has received the registration request message 611 transfers this request message 611 to the server 131 after a protocol converting operation 631 has been carried out. The server 131 which has received the transferred registration request message 612 allocates a local ID (641), and returns a registration completion message 613 to the wireless base station 111. The wireless base station 111 transfers the registration completion message 613 to the sensor chip 101 after a protocol converting operation 632 has been carried out. The sensor chip 101 which has received the transferred registration completion message 614 stores a local ID (623), and then, the operation of the sensor chip 101 is transited to an operating state 624.

In this embodiment 1, the initial registration sequence for performing only the allocation of the local ID has been indicated. Alternatively, while the initial registration sequence is utilized, an encrypted communication may be set; a communication interval may be set; and other various communication parameters may be set, namely, various sorts of negotiations may be carried out between the sensor chip 101 and the server 131.

Figure 7:
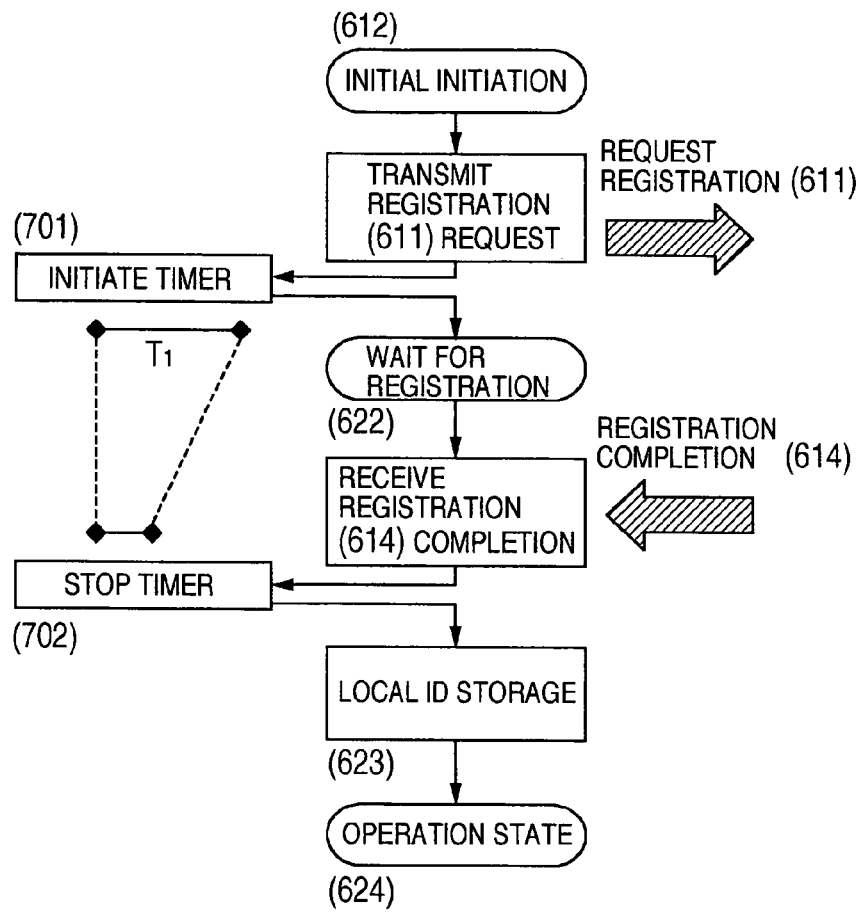
FIG. 7 indicates an operation flow of the sensor chip when the sensor chip is initially registered in the sensor network system of FIG. 1.

FIG. 7 indicates an operation flow of the sensor chip 101 when an initial registration is carried out. The sensor chip 101 transmits the registration request message 611 from the initial initiating state 621. A global ID value of the own sensor chip 101 has been stored in this message 611. After the registration request message 611 has been transmitted, the sensor chip 101 starts a timer (701), and then, the operation thereof is transited to a registration waiting state 622. The registration waiting state 622 corresponds to a waiting time for receiving the registration completion message 614 from the server 131, and the timer sets a time duration of a waiting time. A time-out time "T1" is set on the basis of a response time, typically several seconds. The response time implies such an assumption that the registration completion message 614 may be firmly returned under such a condition that there are no packet loss caused by communication noise in a wireless communication and a wire communication, no congestion of the LAN 120, and no overload of the server 131. As a typical process operation executed in the case that a timeout occurs due to lack of receiving of the registration completion message 614, while it is so assumed that the above-described communication failure happens to occur, a registration request message is resent. FIG. 7 shows such a case that the registration completion message 614 is received before the timeout occurs. When the registration completion message 614 is received, the timer is stopped (702), the local ID value which has been stored in this message 614 is stored in the RAM 260, and then, the operation of the sensor chip 101 is progressed to an operating state 624. In a communication operation under the operation state 624 of the sensor chip 101, this local ID is used.

Figure 8:
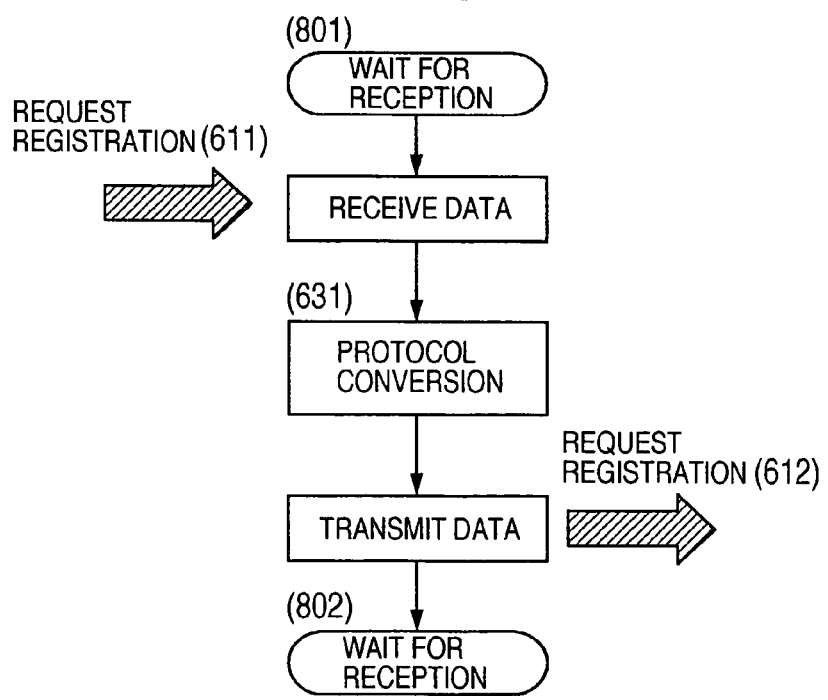
FIG. 8 indicates an operation flow of the wireless base station when the sensor chip is initially registered in the sensor network system of FIG. 1.

FIG. 8 represents an operation flow of the wireless base station 111 when an initial registration is carried out.

When the wireless base station 111 receives the registration request message 611 from the sensor chip 101 under reception waiting state 801, this wireless base station 111 converts this registration request message 611 from the data format of the wireless-sided protocol into the data format of the LAN-sided protocol in accordance with the protocol stack shown in FIG. 5. Then, the wireless base station 111 transfers a registration request message 612 after the data format conversion to the server 131, and the operation thereof is returned to a reception waiting state 802. Also, in the case that the wireless base station 111 receives a registration completion message 613 from the server 131, this wireless base station 111 executes a flow operation similar to the above-explained flow operation, converts the data format of the LAN-sided protocol into the data format of the wireless-sided protocol, and then, transfers a registration completion message 614 whose data format has been converted to a sensor chip.

FIG. 9 shows an operation flow of the server 131 when an initial registration is carried out.

When the server 131 receives the registration request message 612 sent from the sensor chip 101 under reception waiting state 901, the server 131 newly allocates such a local ID value which is uniquely defined within the sensor network system with respect to the global ID value stored in this registration request message 612, and registers a set of both the global ID value and the local ID value (641). Further, the server 131 forms an entry of the data table 431 in order to store thereinto structural information and measurement data of the sensor chip 101 (902). Thereafter, the server 131 transmits an registration completion message 613 to the sensor chip 101, and then, the operation of the own server 131 is returned to a reception waiting state 903.

FIG. 10 represents a structure of the ID table 451 which is managed by the server 131. The ID table 451 is constituted by entries corresponding to the respective sensor chips 101 to 108, while each of these entries is constructed of a global ID, a local ID, and an index to the data table 431. FIG. 10 shows such a case that the global ID corresponds to 128 bits, and the local ID corresponds to 8 bits. For the sake of easy observations, both the ID values are expressed by hexadecimal numbers, and the global ID values are expressed by being segmented by way of columns (:) every 16 bits.

This ID table 451 is used so as to convert a global ID into a local ID, and also, convert a local ID into a global ID. Also, while either a global ID or a local ID is employed as a key, this ID table 451 is used in order to acquire an index value with respect to the data table 431. In a destination indicated by an index value, information as to a corresponding sensor chip is stored.

In the data table 431, structural information and measurement data as to the respective sensor chips are stored. As an example of the measurement data, the following data may be conceived, namely, measurement values equal to raw data; values which are obtained by converting the above-described measurement values in the SI unit; measuring time instants, and the like. As an example of the structural information of the sensor chips, the following data may be conceived, namely, names of manufactures; sorts of sensors; capacities of power supplies; various communication parameters such as radio frequency and the like. As an example of means for acquiring these structural information, various means may be conceived, namely, structural information is manually set by a user; structural information is installed from a medium attached to a product package of a sensor chip; structural information is acquired in an online mode from a support-purpose Web site of a manufacturer; and structural information is automatically acquired in a setting sequence when a sensor chip is initially registered, or after the sensor chip has been registered.

Local IDs are managed by the server 131 in such a manner that these local IDs may become unique values within the sensor network system. In this embodiment 1 where an 8-bit local ID is used, 256 pieces of sensor chips can be stored in maximum. Since the server 131 frequently refers to the ID table 451 and high-speed retrieving characteristics are required for this ID table 451, this ID table 451 is maintained and managed on the RAM 450 of the server 131. As general-purpose techniques capable of performing a retrieving operation in a high speed, a CAM (Contents Addressable Memory) corresponding to a retrieve-dedicated memory may be used, or a hash method corresponding to an algorithm capable of effectively managing a large number of data may be used.

FIG. 11 represents a structure of a wireless frame which is used in a communication between the sensor chip 101 and the wireless base station 111.

In this wireless frame, respective fields are transmitted on the air in this sequence from 1111 to 1116. Both Frame Length 1111 and Message Type 1112 correspond to a header of an RF-MAC layer. Both Local ID 1113 and Sequence Number 1114 correspond to a header of an RF-NW layer, and Data 1115 corresponds to data of an RF-APL layer. FCS 1116 corresponds to a trailer of the RF-MAC layer.

A value of the Message Type 1112 indicative of a registration request is "0x1." In the registration request message 611, a value of the Local ID 1113 is "0x00" which indicates that this Local ID 1113 corresponds to such a Local ID before being allocated. A value of the Sequence Number 1114 is "0x01" which represents a first message sequence after the sensor chip 101 has been initiated. A global ID value of the sensor chip 101 is stored in the Data 1115. A value of the Frame Length 1111 is "0x12." This Frame Length 1111 shows that a payload portion of the RF-MAC layer from which a header and a trailer have been removed, namely, a total of the Local ID 1113, the Sequence Number 1114, and the Data 1115 corresponds to 18 octets. Also, in FCS 1116, a calculation result of CRC (Cyclic Redundancy Check) is stored, where the object of calculation is an entire portion of the RF-MAC frame except for the FCS 1116 itself, namely, the respective fields 1111 to 1115.

A value of the Message Type 1112 indicative of a registration completion is "0x2." In the registration completion message 614, a value of the Local ID 1113 is such a value of "0x5a" which owns a unique value, and has been allocated with respect to the sensor chip 101 by the server 131. A value of the Sequence Number 1114 succeeds the value "0x01" in the registration request message 611, since this message is a response with respect to the registration request message 611. The global ID value of the sensor chip 101 which has been stored in the registration request message 611 is directly resent to the Data 1115 in order to indicate that a destination of this message is the sensor chip 101. Various sorts of information used to be notified from the server 131 to the sensor chip 101 may be contained in the Data 1115 other than the global ID. As a typical example as to such information, operating parameters related to wireless communications and encrypted communications may be employed.

A packet which is used in a communication between the wireless base station 111 and the server 131 is encapsulated by the TCP/IP protocol as shown in FIG. 5. In the most simple implementing operation, the data format of the SN-APL layer may be employed into which the wireless frame shown in FIG. 11 has been directly stored. Alternatively, a simple format conversion may be applied to the format of the SN-APL layer so as to be converted into a text format. In a higher implementing operation, the data format of the SN-APL layer may be converted into a format of a text structured form such as XML. As will be explained later, FIG. 18 and FIG. 19 show one example of XML formats, and such a data format of an SN-APL layer having a similar structure thereto may be readily designed. Some different aspects when data formats of SN-APL layers are designed are conceivable: namely, an aspect in which an implementing operation in a base station becomes simple; and another aspect in which even if a implementing operation in a base station becomes slightly complex, the data format of the SN-APL layer is modified as such a format which may be suitably registered in the data table 431 in the server 131 and the like. An implementer may freely design the data format of the SN-APL layer based upon the optimum aspect for the own sensor network system.

Figure 12:
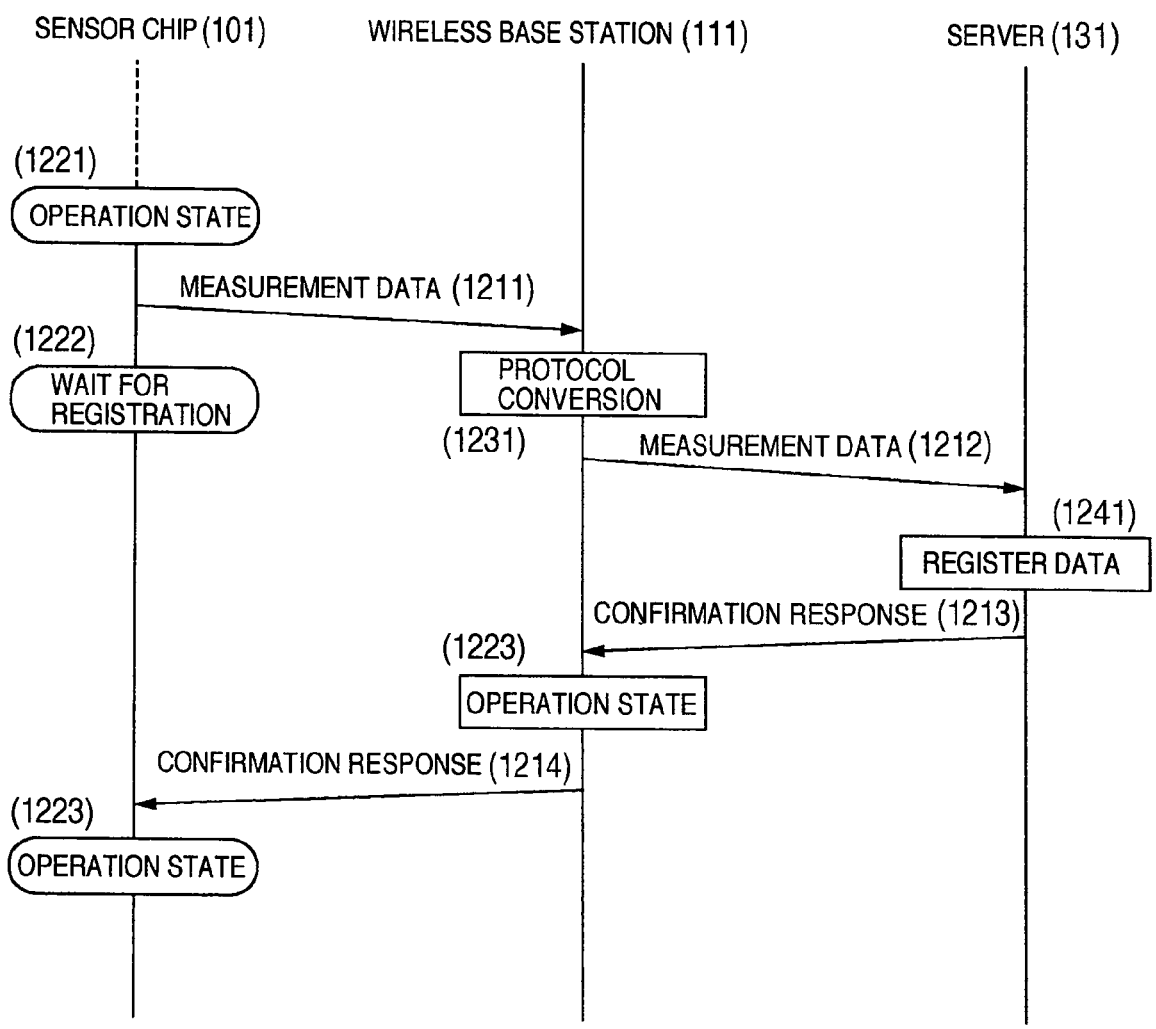
FIG. 12 shows a communication sequence when data is acquired from the sensor chip to the server in the sensor network system of FIG. 1.

FIG. 12 shows a communication sequence executed when data is acquired from the sensor chip 101 to the server 131.

The sensor chip 101 executes a measuring operation by operating the sensor 220 in a periodic manner with respect to an environment where this sensor chip 101 is installed under operating state 1221, and this operating state is transited to a response waiting state 1222 after measurement data has been transmitted in a wireless manner. The wireless base station 111 which has received a measurement data message 1211 performs a protocol conversion with respect to this measurement data message 1211, and then, transfers this protocol-converted measurement data message 1212 to the server 131. The server 131 which has received the transferred measurement data message 1212 registers this measurement data 1212 in the data table 431 (1241), and returns a confirmation response message 1213 to the wireless base station 111. The wireless base station 111 executes a protocol conversion with respect to this confirmation response message 1213, and then, transfers this protocol-converted message to the sensor chip 101. The operation of the sensor chip 101 which has received the transferred confirmation response message 1214 is returned to an operating state 1223.

Figure 13:
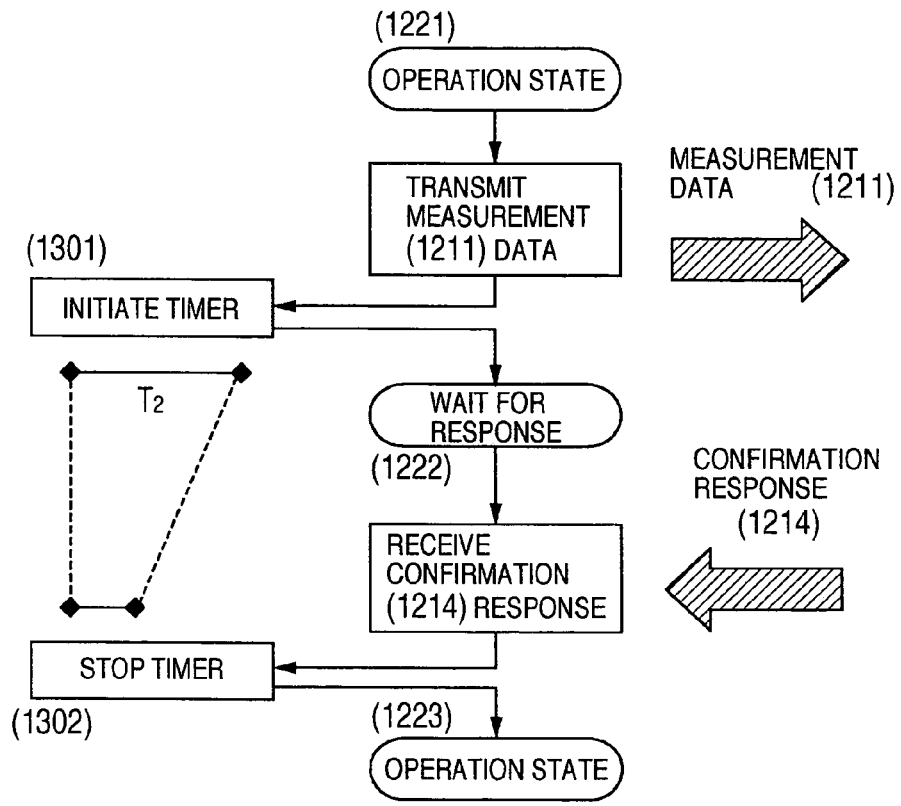
FIG. 13 indicates an operation flow of the sensor chip during data acquisition in the sensor network system of FIG. 1.

FIG. 13 shows an operation flow of the sensor chip 101 when data is acquired.

The sensor chip 101 transmits the measurement data message 1211 at a certain time of the operating state 1221. As timing for initiating the transmission process operation, the following transmission methods are provided: namely, a method for transmitting measurement data every time data is measured; a method for transmitting plural pieces of measurement data at one time, which have been stored in the RAM 260; and a method for transmitting measurement data as response of a data acquisition request from the server 131. In the measurement data message 1211, such a local ID is used which has been allocated by the server 131 when the initial registration of the sensor chip is performed. After the measurement data message 1211 has been transmitted, the timer is initiated (1301), and the operation of the sensor chip 101 is transited to a response waiting state 1222. The response waiting state 1222 corresponds to a waiting time used to receive the confirmation response message 1214 from the server 131, and the timer sets a duration of this waiting time. A timeout time "T2" is typically equal to the timeout time "T1" during the initial registration operation. A typical process operation in the case that the timeout occurs is similar to that when the sensor chip is initially registered, namely measurement data message is resent. Alternatively, while this measurement data is held until a next data acquisition is performed, this stored measurement data may be newly transmitted. In FIG. 13, the case in which the confirmation message 1214 is received before the timeout is shown. Upon receipt of the confirmation message 1214, the sensor chip 101 stops the timer (1302), and the operation of this sensor chip 101 is returned to the operating state 1223. Since it is so confirmed that this measurement data has been registered in the data table 431 of the server 131, the sensor chip 101 may alternatively delete this measurement data from the RAM 260 at such a time when this sensor chip 101 receives the confirmation response message 1214.

An operation flow of the wireless base station 111 when data is acquired is similar to the operation flow shown in FIG.

8. In this embodiment 1, the wireless base station 111 communicates with the sensor chip 101 and the server 131 in such a manner that only a simple conversion of a data format is carried out with respect to a received message, and the format-converted message is merely transferred, but need not change operations thereof, depending upon such a fact that what message is received. Thus, the wireless base station 111 may merely perform such a mechanical-sense operation. That is to say, the wireless base station 111 merely transfers a message received from the RF 330 to the NIF 320, and merely transfers a message received from the NIF 320 to the RF 330.

Figure 14:
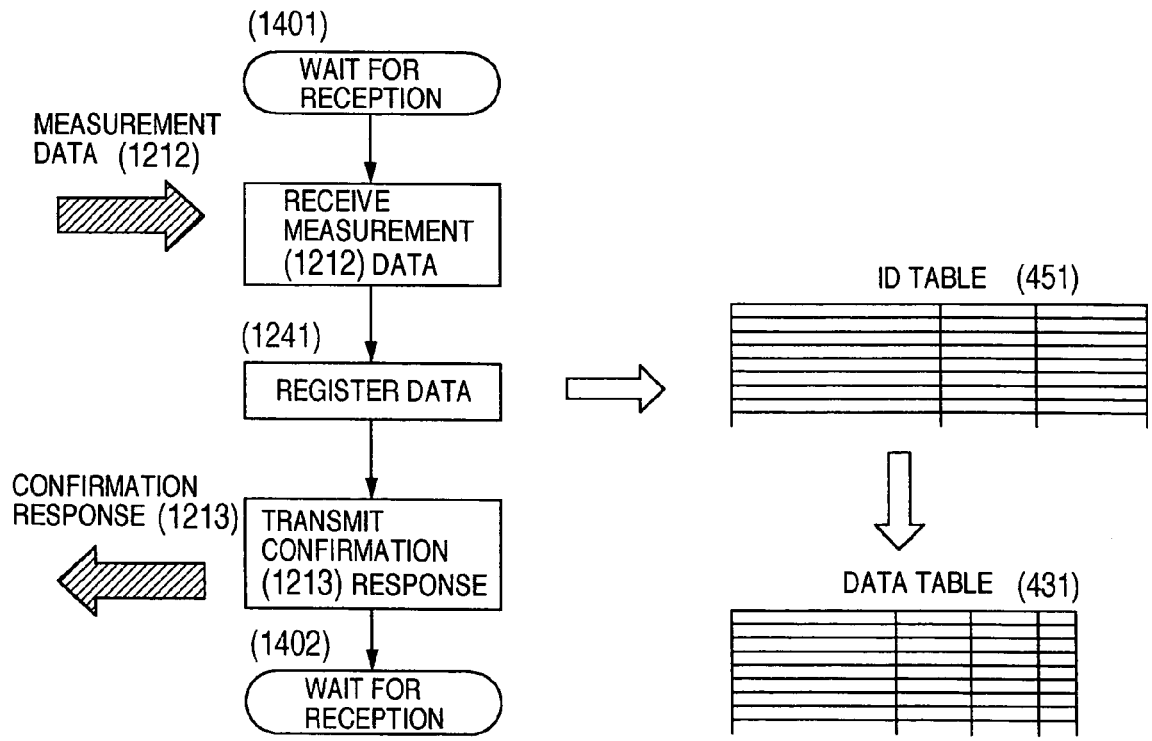
FIG. 14 indicates an operation flow of the server during data acquisition in the sensor network system of FIG. 1.

FIG. 14 shows an operation flow of the server 131 when data is acquired.

When the server 131 receives the measurement data message 1212 sent from the sensor chip 101 under reception waiting state 1401, this server 131 registers measurement data which has been stored in this received message into the data table 431 (1241). As a sequence of this registration process operation, the server 131 firstly acquires a local ID stored in this message 1212, and then, retrieves the ID table 451 while this acquired local ID value is used as a key. As a result of this retrieving operation, an index value to the data table 431 is obtained which corresponds to the sensor chip 101. The server 131 accesses the data table 431 by employing this index value, and registers the measurement data stored in this message 1212 in accordance with a predetermined format. After the registration process operation (1241) has been completed, the server 131 transmits a confirmation response message 1213 to the sensor chip 101, and the operation of this server 131 is returned to a reception waiting sate 1402.

A structure of a wireless frame when the data is acquired is indicated in FIG. 11. A value of Message Type 1112 indicative of measurement data is "0x3." In the measurement data message 1211, a value of Local ID 1113 is a value "0x5a" which is uniquely defined and has been allocated by the server 131. A value of Sequence Number 1114 corresponds to such a value obtained by adding 1 to the value used during the preceding message sequence. In FIG. 11, this value of Sequential Number 1114 is selected to be "0x02", since such a case is expected that this is the first sequence after the initial registration sequence. Into Data 1115, a measurement value itself and additional information related to the measurement value may be stored. In FIG. 11, such an example is shown that both a sensor sort and a measuring time instant are stored as the additional information. The sensor sort indicates that this measurement value corresponds to, for example, a measurement value of a temperature sensor. The measuring time instant is necessary required in the case that there is a time difference from an actual measurement until measurement data is transmitted, while necessary precision such as the unit of a second and the unit of a millisecond is given to this measurement time instant.

A value of Message Type 1112 indicative of a confirmation response is "0x4." In the confirmation response message 1214, the value of Sequence Number 1114 succeeds the value "0x02" in the measurement data message 1211, since this confirmation response message 1214 is a response to the measurement data message 1211. Alternatively, various sorts of information which is notified from the server 131 to the sensor chip 101 may be contained in Data 1115, if required.

As previously explained, when the data is acquired, both the sensor chip 101 and the server 131 are brought into such a condition that the sensor chip 101 and the server 131 can identify the sensor chip 101 based upon the local ID value "0x5a", so that in both the measurement data message 1211 and the confirmation response message 1214, the sensor chip 101 can be identified by employing only the local ID value, and the global ID value need not be used.

Figure 15:
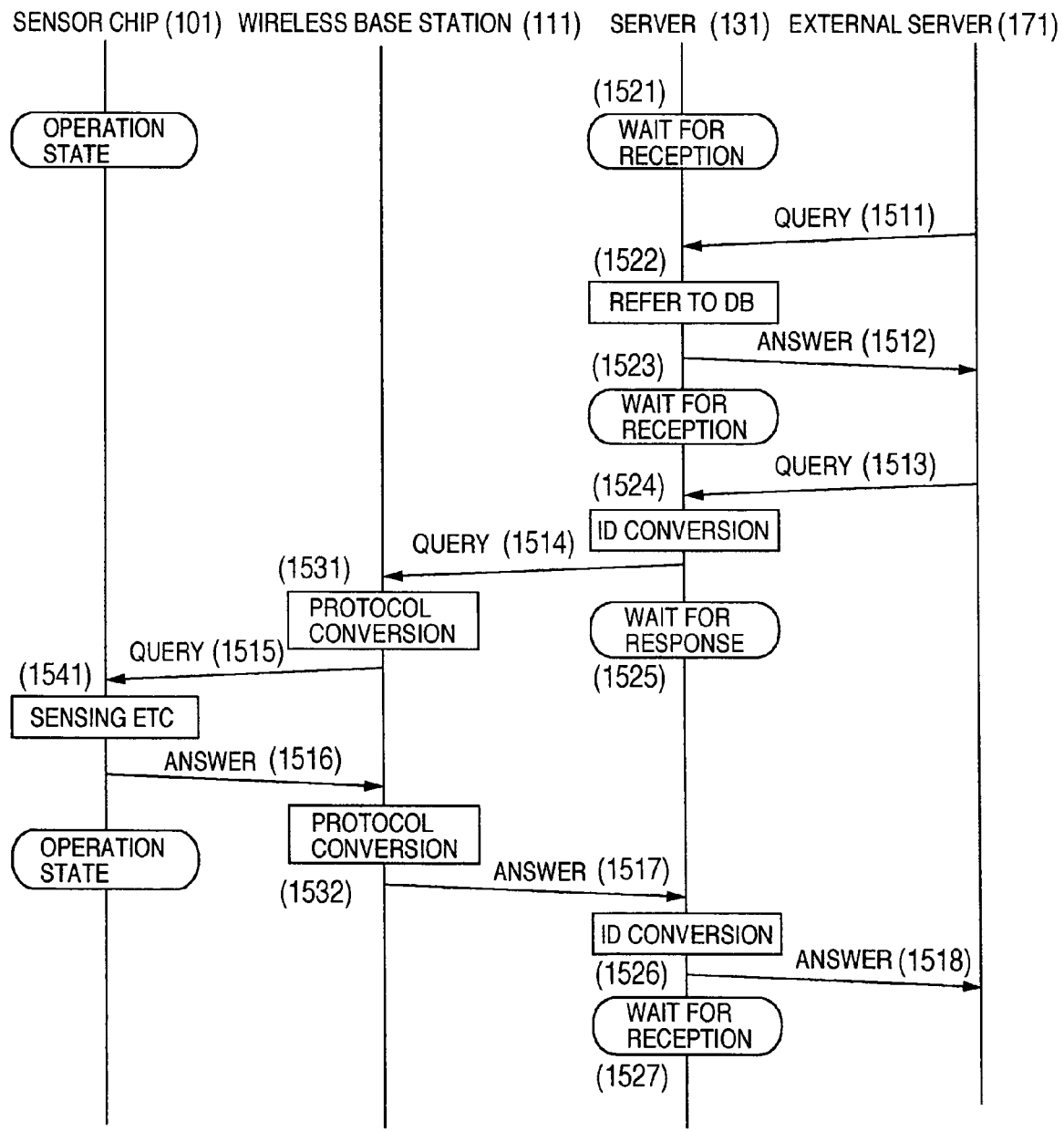
FIG. 15 represents an example of a communication sequence in the case that the sensor network system of FIG. 1 is communicated with an external server.

FIG. 15 shows an example of a communication sequence in the case that the sensor network system of this embodiment 1 is communicated with the external server 171.

A direct communication with the external server 171 is carried out by the server 131. The external server 171 firstly transmits a query 1511 to the server 131. This query 1511 corresponds to such a query to which the server 131 itself can respond with reference to the ID table 451 and/or the data table 431 held in the server 131 (1522). As an example of such a query 1511, a list of the sensor chips which are presently operated in this sensor network system is acquired; and past measurement data as to a specific sensor chip is acquired. The server 131 responds to this query 1511 by way of an answer 1512. In the query 1511 and the answer 1512, identification information indicative of a sensor chip is a global ID. Since a local ID is identification information which is effective only within the sensor network system, this local ID is not used in a communication established outside this system.

Next, the external server 171 transmits a query 1513 to the server 131. This query 1513 corresponds to such a query to which the server 131 itself cannot respond, but requires to interrogate the sensor chip 101. As an example of such a query 1513, measurement data at a present time instant is acquired; and an operating parameter of the sensor chip 101 is required to be changed. When the server 131 judges that this server 131 is required to interrogate the sensor chip 101 in order to respond to this query 1513, the server 131 issues a query 1514 to the sensor chip 101. This query 1514 may be made by merely protocol-converting the query 1513 to transfer the protocol-converted query, and/or may be made by reconstructing such a query based upon the query 1513 as to an implication. In any one of these cases, a global ID is used as the identification information of the sensor chip 101 in the query 1513, whereas a local ID is used as the identification information thereof in the query 1514. To this end, the server 131 performs an ID conversion (1524).

The query 1514 is protocol-converted in the wireless base station 111 (1531), and then, the converted query 1514 is transferred to the sensor chip 101. The sensor chip 101 executes a process operation corresponding to the content of the query 1515, for example, executes a sensing operation (1541), and then, returns an answer 1516. This answer 1516 is protocol-converted in the wireless base station 111 (1532), and then, the protocol-converted answer is transferred to the server 131. The server 131 converts a local ID contained in the answer 1517 into a global ID (1526), and resends an answer 1518 to the external server 171.

Alternatively, both the query 1511 and the query 1513 may constitute two sets of queries having independent own contents, and may constitute a series of such a sequence that the query 1513 is issued in response to the answer 1512 for the query 1511. As a typical example with respect to a series of such a sequence, the following sequence may be conceived. That is, the external server 171 finds such a sensor chip which may be matched with a specific condition by sending the query 1511, and issues a detailed interrogation with respect to the relevant sensor chip by using the query 1513.

Figure 16:
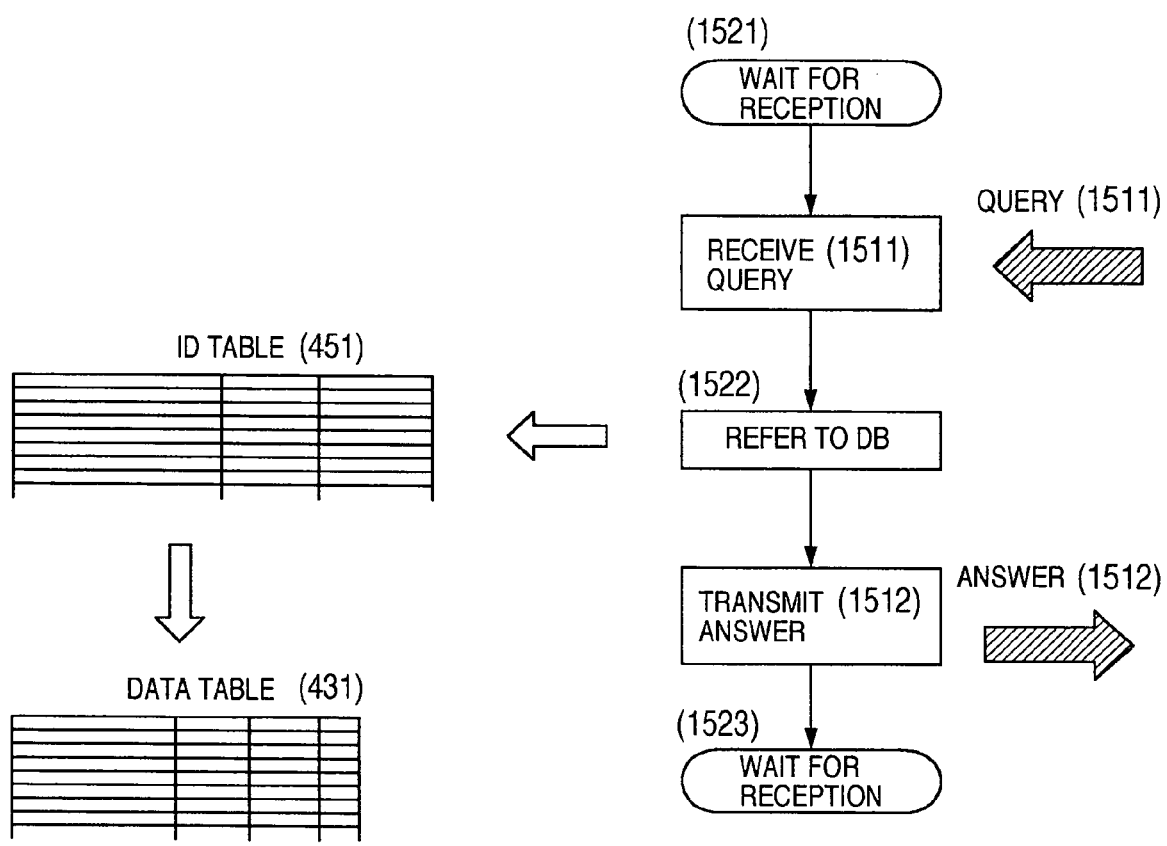
FIG. 16 shows an operation flow after the server receives a query 1511 until the server returns an answer 1512 in the sensor network system of FIG. 1.

FIG. 16 shows an operation flow after the server 131 receives the query 1511 until the server 131 resends the answer 1512.

The server 131 receives the query 1511 under reception waiting state 1521, and refers to the data table 431 in response to the query content (1522). In order to refer to the data table 431, the server 131 refers to the ID table 451 if necessary, and acquires an index value which corresponds to such a sensor chip to be retrieved. The server 131 generates the answer 1512 based upon the reference result of the data table 431, and transmits this generated answer 1512 to the external server 171, and thereafter, the operation of this server 131 is returned to a reception waiting state 1523.

Figure 17:
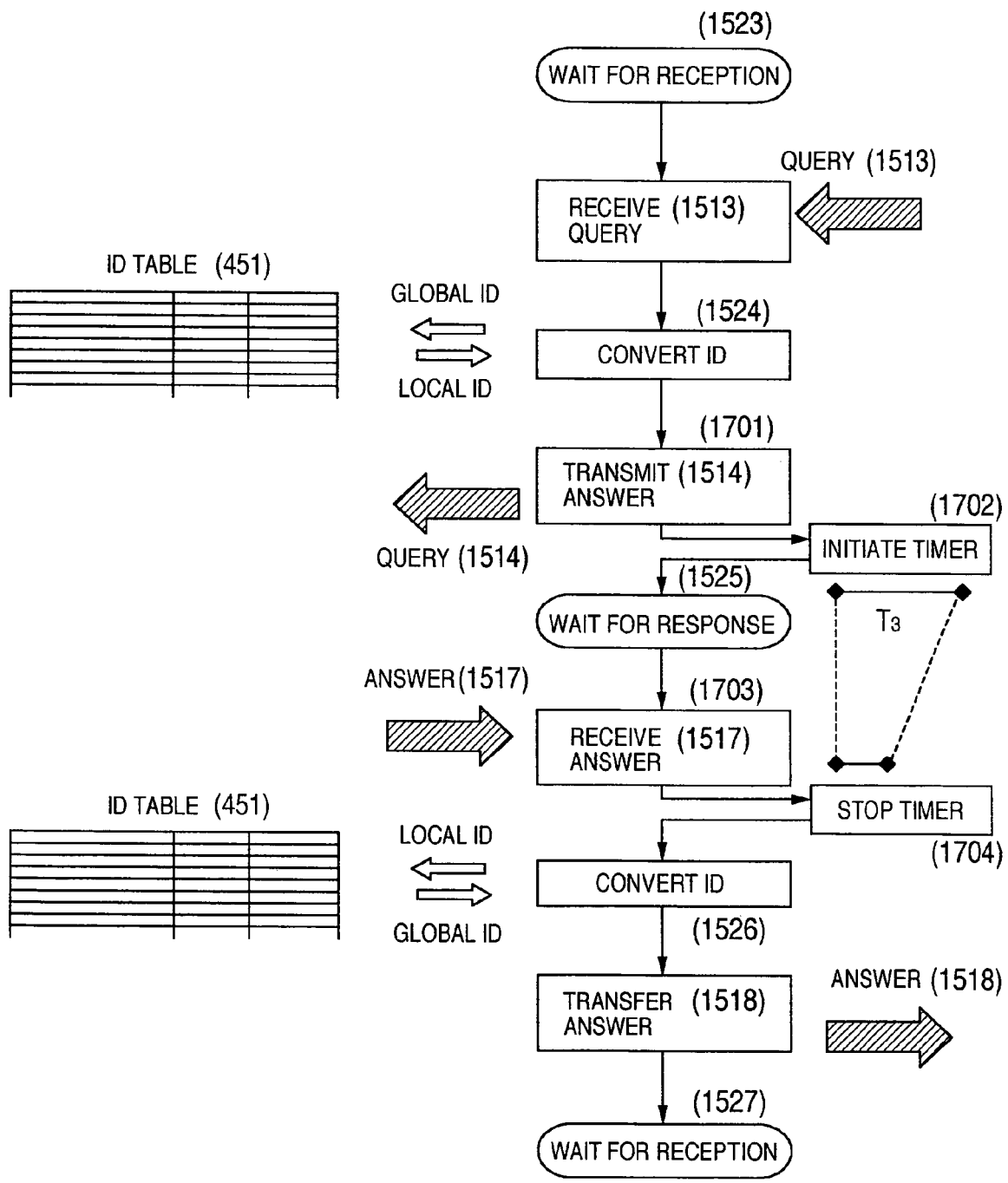
FIG. 17 shows an operation flow after the server receives a query 1513 until the server returns an answer 1518 in the sensor network system of FIG. 1.

FIG. 17 shows an operation flow after the server 131 receives the query 1513 until the server 131 returns the answer 1518.

When the server 131 receives the query 1513 under the reception waiting state 1523, the server 131 analyzes the query content thereof and judges that an interrogation to the sensor chip 101 is required. While a global ID value contained in the query 1513 is used as a key, the server 131 retrieves the ID table 451 so as to acquire a local ID value corresponding to this global ID value (1524), and further, performs a protocol conversion from XML-APL into SN-APL. If required, the server 131 performs a reconstruction of the query content. The server 131 generates a query 1514 in the above-explained manner, and then, transits the generated query 1514 to a sensor chip (1701). After the query 1514 has been transited, the server 131 starts the timer (1702), and the operation of the server 131 is transited to a response waiting sate 1525. The response waiting state 1525 corresponds to such a waiting time for receiving an answer 1517 from the sensor chip 101, and the timer sets a time duration of a waiting time. A timeout time "T3" is set on the basis of a response time, typically several seconds. The response time implies such an assumption that the answer 1517 may be firmly resent under such a condition that there are no packet loss caused by communication noise in a wireless communication and a wire communication, no congestion of the LAN 120, and no abnormal operation of the sensor chip 101. As a typical process operation executed in the case that a timeout occurs due to lack of receiving of the answer 1517, while it is so assumed that the above-described communication failure happens to occur, the query 1514 is resent. FIG. 17 shows such a case that the answer 1517 is received before the timeout occurs. When the answer 1517 is received, the timer is stopped (1704). While a local ID value contained in the answer 1517 is employed as a key, the server 131 retrieves the ID table 451 so as to acquire a global ID value corresponding to this local ID value (1526), and further, executes a protocol conversion from SN-APL to XML-APL. The server 131 also reconstructs the answer content if necessary. The server 131 generates an answer 1518 in this manner, and transits the generated answer 1518 to the external server 171, and thereafter, the operation of this server 131 is returned to the reception waiting state 1527.

FIG. 18 represents a format of an XML-APL layer in the query 1511.

In this format, a row 1801 indicates that this query 1511 follows an XML format. An entire statement is sandwiched by a row 1802 and a row 1830, and indicates that this statement follows a service rule defined for the sensor network.

Rows 1803, 1804, and 1805 show an issuing date/time of this query 1511, an identifier of the external server 171 corresponding to the issue source, and an identifier of the server 131 corresponding to the destination, respectively.

A real body of the query 1511 is described by being sandwiched between rows 1806 and 1829.

A row 1807 shows an identifier of this query 1511.

A portion sandwiched between a row 1808 and a row 1812 corresponds to a description related to an output format of an answer. The answer 1512 requests that an ID of a sensor chip, namely a global ID is outputted in a list form.

A portion sandwiched between a row 1813 and a row 1828 corresponds to a description related to a retrieve condition. An entire of the retrieve condition is sandwiched between a row 1814 and a row 1827, and implies a description related to a sensor chip. A row 1815 shows that a sensor chip installed in a welding room is an object. A portion sandwiched between rows 1816 and 1826 corresponds to a description related to a sensor. A row 1817 indicates that a sensor chip having a temperature sensor corresponds to an object. A portion sandwiched between rows 1818 and 1825 corresponds to a description related to measurement data. A row 1819 represents that such a measurement data of today, namely the issuing day of this query 1512 (Jul. 12, 2004) corresponds to an object. A portion sandwiched between rows 1820 and 1824 corresponds to a condition formula related to the measurement data. A condition formula higher than, or equal to 28.0 centigrade degrees is defined by rows 1821, 1822, 1823.

As previously explained, the query 1511 constructed of the XML format shown in FIG. 8 implies that "display a list of sensor chips which have measured temperatures higher than, or equal to 28.0 centigrade degrees as the room temperature of the welding room on Jul. 12, 2004."

FIG. 19 represents a format of an XML-APL layer in the answer 1512.

In this format, a row 1901 indicates that this answer 1512 follows an XML format. An entire statement is sandwiched by a row 1902 and a row 1920, and indicates that this statement follows a service rule defined for the sensor network. Rows 1903, 1904 and 1905 show an issuing data/time of this answer 1512, an identifier of the server 131 corresponding to the issue source, and an identifier of the external server 171 corresponding to the destination, respectively.

A real body of the answer 1512 is described by being sandwiched between rows 1906 and 1919.

A row 1907 shows an identifier of this answer 1512.

A portion sandwiched between a row 1908 and a row 1910 corresponds to an identifier of the original query 1511, and indicates that this answer 1512 is a response with respect to the query 1511. A row 1911 shows that this answer 1512 corresponds to the normal response with respect to the query 1511.

A portion sandwiched between a row 1912 and a row 1918 corresponds to a display of retrieve results made in accordance with the output format designated by the query 1511, and corresponds to a list of global IDs as to sensor chips which can be matched with a condition.

As explained above, the answer 1512 constructed of the XML format shown in FIG. 19 implies that upon receipt of the query 1511, the server 131 retrieves the own data table 431, discovers 3 pieces of the sensor chips which can be matched with the retrieve condition based upon the retrieve result, and then, answers the global IDs of these three sensor chips.

Similarly, both the query 1513 and the answer 1518 are described in accordance with XML formats similar to those of FIG. 18 and FIG. 19.

The query 1514 is described in accordance with the format rule of the SN-APL layer. Alternatively, the query 1514 may be described in accordance with a structural format of a text base such as XML, or a format of a binary base as shown in FIG. 11. These format descriptions may be similarly applied to the answer 1517.

Both the query 1515 and the answer 1516 are described in accordance with a format similar to that of FIG. 11.

Although various sorts of packaging operations may be realized as to detailed contents of these formats, application scopes of the present invention are not influenced by the differences in these formats. An intended aspect of the present invention is given as follows: That is, even when any types of formats are employed, as the identifiers of the sensor chips, the global IDs are employed in the communications outside the sensor network system such as the query 1511, the answer 1512, the query 1513, and the answer 1518, whereas the local IDs are employed in the communications inside the sensor network system such as the query 1514, the query 1515, the answer 1516, and the answer 1517.

This embodiment 1 has exemplified that the external server 171 issues the communication with respect to the server 131. Alternatively, the server 131 may issue a communication with respect to the external server 171. Also, there is no need that the sorts of messages which are transmitted/received are limited to the answer/query modes, and also, are limited to the packaging operations by employing XML. For instance, such a packaging operation may be alternatively carried out with employment of such protocols as TELNET and SNMP.

Embodiment 2

In the embodiment 1, a local ID had a fixed length of 8 bits. In contrast, in an embodiment 2 of the present invention, local IDs own variable lengths within the sensor network system.

FIG. 20 indicates a structure of an ID table 451 which is managed by the server 131 in this embodiment 2. Similar to FIG. 10, a global ID is made of 128 bits. On the other hand, values of different bit lengths are allocated to local IDs every sensor chip. In FIG. 20, the global IDs are represented by using hexadecimal numbers, whereas the local IDs are represented by using binary numbers in order to easily observe that bit lengths thereof are variable.

One of different points from those of FIG. 10 is given as follows: That is, communication cost as to each of the sensor chips is managed. In this case, communication cost implies such an amount for evaluating cost required in a wireless communication process operation in each of these sensor chips based upon power consumption thereof.

FIG. 21 indicates a formula of calculating the above-explained communication cost in the embodiment 2.

In accordance with the definition of this drawing, the larger the capacity (Cap) of the power supply becomes, the lower the communication cost (Cost) is decreased. Also, the higher the electric power (W) becomes which is required to transmit/receive 1 bit, the higher the communication cost (Cost) is increased. Also, the longer the bit length (L) of 1 frame becomes, the higher the communication cost is increased. Further, the larger the transmission/reception frequency (F) becomes, the higher the communication cost (Cost) is increased.

In other words, the higher the communication cost (Cost) of the sensor chip is increased, the shorter the operable time thereof becomes. While respective parameters which may determine communication cost (Cost) may have different values every sensor chip, the communication cost (Cost) unifies contributions of the respective parameters so as to give an unified evaluation index related to operation lifetime.

In the communication cost calculating formula, the respective parameters of W, L, F may be alternatively separated when a transmission is carried out and when a reception is performed so as to evaluate the separated parameters. Alternatively, these parameters may be evaluated by adding other elements than those shown in this drawing, for example, power consumption of a sensor and a microcomputer. A further detailed communication cost calculating formula may be obtained with respect to a frequency band, a coding system as to a wireless communication, and a multiplexing system thereof. A definition as to communication cost may be made in detail by considering only necessary parameters for actual operations, and conversely, may be simplified by considering only necessary parameters for actual operations.

Since the communication cost (Cost) of the sensor chips 102 and 103 in FIG. 20 is equal to 6.2 and 8.1 respectively, in the case that the local ID having the 8-bit fixed length shown in FIG. 10 is used, the sensor chip 103 owns only approximately 77% of the operating lifetime owned by the sensor chip 102. In accordance with this embodiment 2, even under such a condition, fluctuations of the operating lifetimes owned by the respective sensor chips can be smoothed as being permitted as possible, and thus, the lifetime as to the entire system can be prolonged. In FIG. 20, local IDs having short bit lengths have been allocated with respect to sensor chips whose communication cost is high, whereas local IDs having long bit lengths have been allocated with respect to sensor chips whose communication cost is low. As a result, such an effect may be achieved that a bit length (L) of 1 frame is changed, and a difference in the communication cost is canceled. Under such a condition that a structural portion of a wireless frame other than a local ID is similar to the structure shown in FIG. 11, as indicated in FIG. 20, if a 1-bit local ID is allocated to the sensor chip 102 and an 8-bit local ID is allocated to the sensor chip 103 as indicated in FIG. 20, then a ratio of the operating lifetimes may be relaxed up to approximately 87% assuming now that electric power (W) required to transmit/receive 1 bit is identical to each other during transmission and reception.

As a method for allocating a local ID having a variable length with respect to a global ID having a fixed length, various sorts of FV codes (Fixed-Variable Length Code) may be applied which have been widely utilized in data compressing technical fields.

The Huffman code is known as the typical FV code. If the Huffman code is applied in this embodiment 2, then the communication cost as the entire system can be theoretically minimized. Also, while the Huffman code owns such a nature called as "Prefix Code", such a code can be uniquely defined as which code by sequentially matching Huffman codes with each other from an upper grade bit. As a result, there is no need that a field for designating a bit length of a local ID is separately provided in a frame format. In other words, also in this embodiment 2, the wireless frame structure shown in FIG. 11 may be directly applied.

In a data compression to which the Huffman code is normally applied, a code having a small bit length is allocated to such a data whose appearing ratio is high. In this embodiment 2, when the Huffman coding algorithm is applied, "data to be coded" is replaced by "global ID", and "appearing ratio of data" is replaced by "communication cost." In other words, the Huffman coding algorithm is applied in such a manner that a local ID having a small bit length is allocated to a global ID of a sensor chip whose communication cost is high.

In this embodiment 2, there are one case that communication cost of the respective sensor chips may be previously grasped in a fixed manner before operations of these sensor chips, and another case that the communication cost are dynamically varied during operations of these sensor chips. As an example of such a case that the communication cost of the respective sensor chips may be previously grasped in the fixed manner before operations of these sensor chips, the following cases are conceivable. That is, communication cost may be calculated in the fixed manner from product specifications when sensor chips are shipped; and operating parameters are clearly set by a user, while these operating parameters correspond to measuring intervals of sensor chips, transmitting intervals of measurement data, transmission power strengths, and the like. As an example of such a case that the communication cost is dynamically varied during operations of these sensor chips, the below-mentioned cases may be conceived. That is, due to such a reason that a plurality of components are combined with each other and the combined components are operated, communication cost may not be calculated in the fixed manner from product specifications when sensor chips are shipped; as explained above, the operating parameters of the sensor chips are dynamically changed during the operations; and while power supplies of sensor chips are such power generating apparatus as solar cell power generating apparatus and very small vibration power generating apparatus, remaining power amounts are increased/decreased.

In such a case that the communication cost of the respective sensor chips may be previously grasped in the fixed manner before the operations thereof, and there is a small possibility that a sensor chip is newly added during the operations, or such a sensor chip under use is removed during the operations, all of these sensor chips are initially registered in a batch manner when the entire system is conducted, and also, under such a condition that local IDs having variable lengths have been allocated to the respective sensor chips in the fixed manner. As a result, fluctuations in the lifetimes of the respective sensor chips can be smoothed in the subsequent operation, and the lifetime as to the entire system can be prolonged.

In such a case that the communication cost of the respective sensor chips may be previously grasped in the fixed manner before the operations thereof, and there are large possibilities that a sensor chip is newly added during the operations, or such a sensor chip under use is removed during the operations, since a high/low relationship of the communication cost among the sensor chips may be dynamically changed during operations, even if the local IDs which has been firstly allocated in the initial registration are continuously used in the fixed manner, the following effect cannot be always achieved, namely, the fluctuations in the lifetimes of the respective sensor chips may not be always smoothed in the subsequent operation, and the lifetime as to the entire system may not be always prolonged. In such a case that since the local IDs are newly reallocated to the respective sensor chips in either a periodic manner or a necessary case, the above-described effects may be achieved.

A plurality of methods may be conceived in a communication sequence capable of realizing a dynamic reallocation of a local ID. As one realizing method, as indicated in FIG. 6, a communication sequence which is similar to that executed when the initial registration is performed is carried out. This method corresponds to such a method that a sensor chip requests a server to reallocate a local ID, and may function in the highest efficiency in such a case that the sensor chip is equipped with a means for calculating a communication cost value while the own sensor chip is operated. In the most simple method in such a case that the sensor chip is not equipped with a means for calculating a communication cost value while the own sensor chip is operated, such a communication sequence is initiated in a periodic manner, by which the sensor chip requests the reallocation. For instance, this communication sequence may be initiated every time a time duration equal to 10% of averaged operating lifetimes has elapsed. As another realizing method by a communication sequence which is slightly different from that shown in FIG. 6, the server judges a reallocation necessity of a local ID, and then, notifies a new local ID value which is wanted to be reallocated to a sensor chip.

Since this communication sequence is initiated by the server, this communication sequence is suitable for such a case that the server is equipped with a means for calculating communication cost values during operations of the respective sensor chips. In a realizing method by a further communications sequence, the respective sensor chips notify communication cost values under operations of the own sensor chips to the server in either a periodic manner or an instruction of the server; the server which has acquired the communication costs from all of the sensor chips judges the necessities for reallocating new local ID values to all of these sensor chips; and when the server judges that the reallocation is required, this server executes the reallocations with respect to all of the sensor chips.

As previously explained, various sorts of methods may be employed as to the communication sequences capable of realizing the dynamic reallocation of the local ID values. Even when any of these realizing methods is employed, the employed realizing method does not give any influence to the basic idea of the present invention.

As previously explained, this embodiment 2 is featured by that the local IDs have the variable lengths within the system. Although the local IDs own the fixed lengths within the system in the embodiment 1, the bit lengths of the local IDs may be selected in response to a scale of this system. For example, in the case that plural sensor network systems "A" and "B" are provided based upon the embodiment 1, a local ID may have an 8-bit fixed length in the sensor network system "A", whereas a local ID may have a 16-bit fixed length in the sensor network system "B." In this alternative case, the sensor network system A may store thereinto 256 pieces of sensor chips in maximum, whereas the sensor network system B may store thereinto 65,536 pieces of sensor chips in maximum.

Embodiment 3

The embodiment 1 and the embodiment 2 have described such a method that in the server 131, the local IDs are allocated, and the relationship between the global IDs and the local IDs is defined, and also the conversions between these. IDs are carried out.

Alternatively, several modifications other than the above-described method may be made in accordance with the present invention.

In an embodiment 3 of the present invention, although the local IDs are allocated in the server 131, the corresponding relationship between the local IDs and the global IDs is stored in the wireless base station 111, and when the wireless base station 111 intermediates a communication between the sensor chip 101 and the server 131, this wireless base station 111 converts the global IDs into the local IDs with each other, and vice versa.

Figure 22:
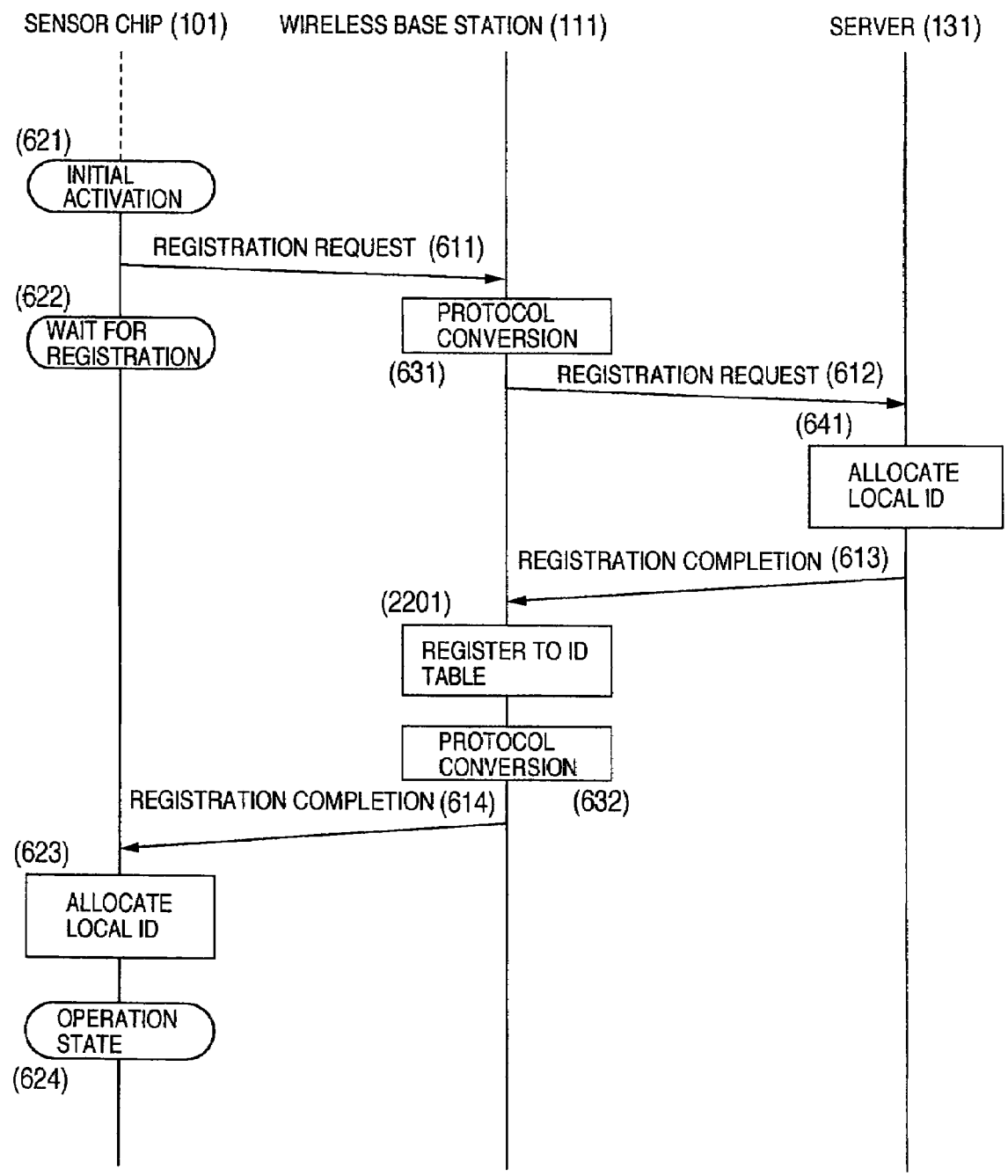
FIG. 22 represents a communication sequence when a sensor chip is initially registered in a sensor network system according to an embodiment 3 of the present invention.

FIG. 22 shows a communication sequence when a sensor chip is initially registered in this embodiment 3. It should be noted that message sequences which are transmitted/received among the respective apparatus are equivalent to those of the embodiment 1 shown in FIG. 6. A different point from FIG. 6 is given as follows: That is, when the wireless base station 111 transits the registration completion message 613 sent from the server 131 to the sensor chip 101, the wireless base station 111 registers a corresponding relationship between the global ID and the local ID into an ID table provided in the own wireless base station 111 (2201).

Figure 23:
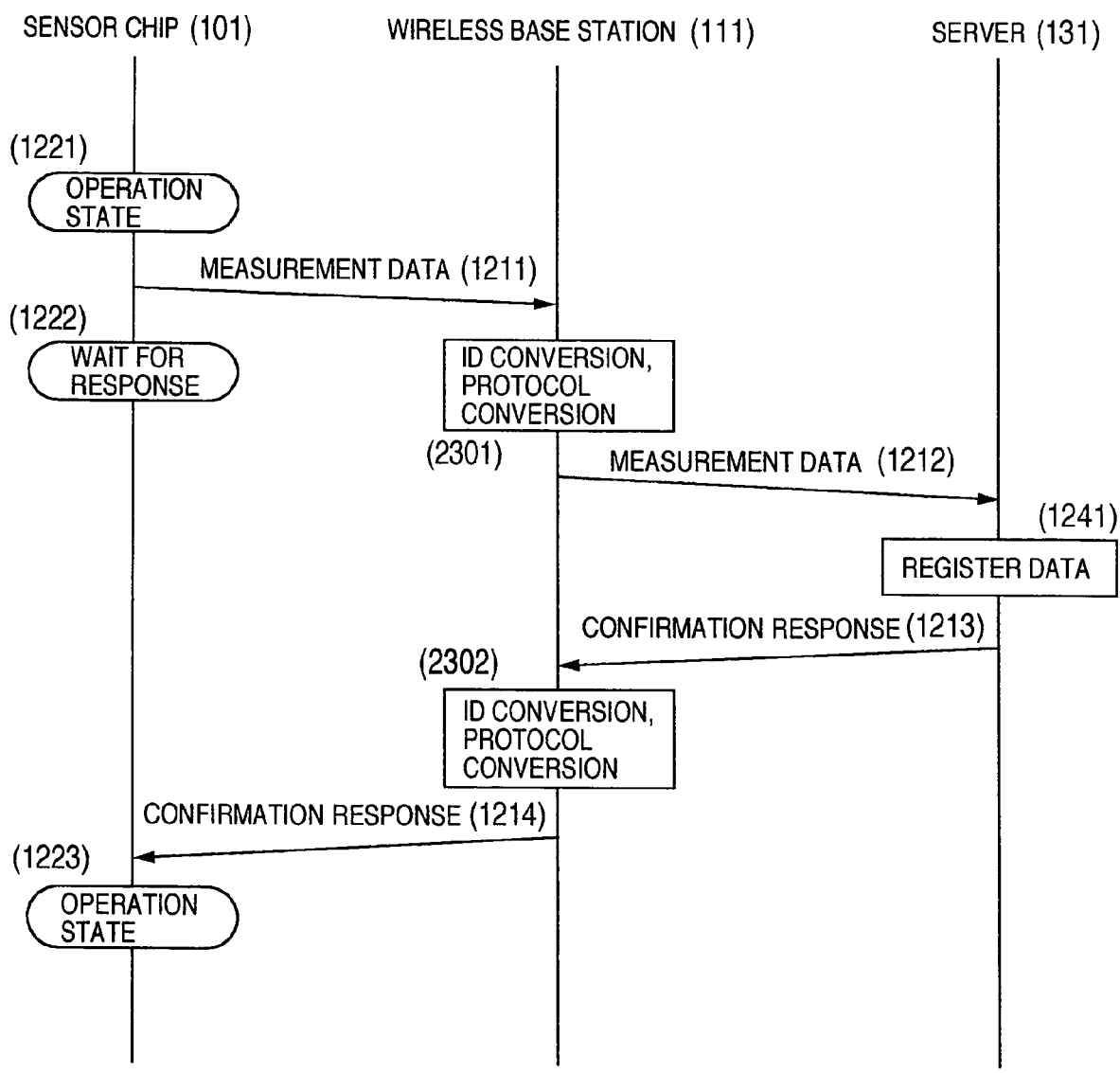
FIG. 23 represents a communication sequence when data is acquired in the sensor network system according to the embodiment 3 of the present invention.

FIG. 23 shows a communication sequence when data is acquired in this embodiment 3. It should be noted that message sequences which are transmitted/received among the respective apparatus are equivalent to those of the embodiment 1 shown in FIG. 12. A different point from FIG. 12 is given as follow: That is, when the wireless base station 111 transits the measurement data message 1211 sent from the sensor chip 101 to the server 131, the wireless base station 111 converts the local ID into the global ID (2301). Also, when the wireless base station 111 transits the confirmation response message 1213 sent from the server 131 to the sensor chip 101, the wireless base station 111 converts the global ID into the local ID (2302).

As apparent from the foregoing descriptions, functional structures and operation flows of the respective apparatus according to this embodiment 3 may be readily realized by slightly changing those of the embodiment 1. A supplementary explanation will now be briefly made. The functional structures and the operation flows as to the sensor chip 101 are completely identical to those of the embodiment 1. The wireless base station 111 manages the ID table used to establish the relationship between the global IDs and the local IDs, which is similar to the ID table 451 which is held by the server 131 in the embodiment 1. As shown in FIG. 22, an entry of this ID table is registered when the registration completion message 613 is transited. Basically speaking, since the server 131 identifies a sensor chip based upon a global ID, the server 131 need not mutually convert the global ID into a local ID with each other even when the server 131 intermediates a communication executed inside the system and a communication executed outside the system. However, since exclusive characteristics of local IDs which are allocated to the respective sensor chips must be guaranteed, a necessity for managing the relationship between the global IDs and the local IDs by using either the ID table 451 or substituting means thereof will remain.

In this embodiment 3, a local ID is used only in a wireless communication from a sensor chip to a wireless base station, and even in a communication made inside the system, a global ID is used in a communication from the wireless base station to a server. As a consequence, both a protocol and a data format which are transmitted/received by the server may be alternatively unified as XML-APL even in a communication made inside the system, and in a communication made outside the system. Web service relative techniques including XML have been widely popularized as the standard techniques of distributed type network application programs and of mutual linking type network application programs, and open developing environments have been actively prepared. Also, in sensor network systems, since the Web service relative techniques are gradually applied thereto, the following effects may be achieved. That is, sensor network systems may be easily developed; function expanding characteristics may be improved; and complex application software may be readily lined with each other.

Embodiment 4

The embodiment 1 has described the method in which a global ID is used in order to identify each of the sensor chips in a communication with the external server 171. In an embodiment 4 of the present invention, such a method is represented that while a global ID itself is not used in order to identify a sensor chip, another identification information which has been related to the global ID within the server 131 is used.

FIG. 24 shows an example of a communication sequence between the external server 131 and the external server 171 in this embodiment 4.

First, the external server 171 acquires general-purpose system information as to the server 131 (2410). In other words, the external server 171 accesses an URL 2441 in accordance with HTTP sequences 2411 and 2412. This URL corresponds to an HTML document indicative of a top page of the server 131. It is preferable to describe the general-purpose system information on the top page in view of a data hierarchical structure.

Next, the external server 171 acquires list the external server 171 accesses an URL 2442 in accordance with HTTP sequences 2421 and 2422. This URL corresponds to an HTML document linked from a top page 2441, and corresponds to a result which has been selected by the external server 171 by using a means for determining that the external server 171 subsequently accesses which URL based upon the information of the top page 2441. As this URL determining means in the external server 171, such a method may be employed in which a user uses a Web browser so as to determine a URL in an interactive manner. Alternatively, such a method may be employed in which a program installed in the external server 171 automatically determines an URL. The list information of the sensor chips described in the URL 2442 is different from that of the embodiment 1, and the global ID is not used in the identification information of the sensor chip, but a certain character string is used instead of the global ID. For instance, when a sensor chip equipped with a temperature sensor is employed, such a character string as "thermo1" and "thermo2" may be used. Although this identification information must own an exclusive meaning at least within the system, any types of identification information may be freely used. Alternatively, this identification information may be manually set by the user, and may be automatically generated by the server 131 based upon information acquired from the sensor chip.

Next, the external server 171 acquires measuring history information of a specific sensor chip (2430). That is to say, the external server 171 accesses an URL 2443 in accordance with HTTP sequences 2431 and 2432. In this URL, "get-sensing-data.cgi" indicates a file name of a CGI program so as to acquire information of a sensor chip. Both "node=thermo2" and "period=today" indicate parameters to be transited to this CGI and designate that a today's measurement history as to such a sensor chip called as "thermo2" is acquired. The information as to these CCI name, parameter name, meanings thereof, and use methods thereof may be described in a page 2442 of the sensor chip list, or may be described in another page which is linked from the page 2442. As a means for designating the URL 2443, such a method may be employed in which a user uses a Web browser so as to determine a URL in an interactive manner. Alternatively, such a method may be employed in which a program installed in the external server 171 automatically determines an URL.

In this embodiment 4, a global ID is not used so as to identify a sensor chip in a limited example shown in FIG. 24. Instead of this global ID, the server 131 represents another identification information such as "thermo2" contained in the URL 2442 with respect to the external server 171. While the external server 171 employs this "thermo2" as the identifier of the sensor chip, the external server 171 accesses detailed information and a measurement history of this sensor chip. As a result, the server 131 must manage a corresponding relationship between this identification information and the global ID in an internal manner. This is a similar reason that the server 131 manages the corresponding relationship between the global IDs and the local IDs in the communication made inside the system. Also, as a method of realizing the management, a similar technique may be applied.

In this embodiment 4, identification information of a sensor chip which is opened to the external server 171 by the server 131 corresponds to such an information having an arbitrary format, which is uniquely defined at least in the system. As explained in this embodiment 4, in the case that the character string is used which reflects the sort and the usage of the sensor chip, there is an effect that easy understandings by the user can be improved. Also, in such a case that the sensor network system is linked to a service provided by a third party, if the global ID is concealed, then the third party cannot be linked to a support site of a maker. As a result, such an effect may also be achieved, by which unnecessary leakage of the detailed information to any party outside the system can be prevented. Apparently, in the case that the detailed information is wanted to be actively disclosed, the global ID may be opened in combination with the above-explained identification information. In this embodiment 4, for instance, both such an identifier as "thermo2" and the global ID value may be described in the URL 2442. Alternatively, the detailed information related to the sensor chip "thermo2" may be described in such an URL as "http://factory-1.corp-a.com/sensors/thermo2.html" which is lined from the URL 2442, and the global ID value may be contained as one of this detailed information.

As explained in this embodiment 4, the method for employing HTTP in the communication made outside the system is suitably applied to such a case that the user accesses the database of the server in the interactive manner. Since the data can be acquired in the HTML format, this data may be easily visualized by way of a general-purpose Web browser. Also, an access restriction by using a password may be easily made, and an encryption communication using SSL may be readily realized. While these various techniques have be widely used as the Web page forming technique, developing environments have also be established. Also, in the case that an automatic access to structured data is realized without intermediating an interactive operation by a user, SNMP (Simple Network Management Protocol) which has been widely used so as to monitor networks may be alternatively used. Further, LDAP (Lightweight Directory Access Protocol) capable of realizing a directory service may be utilized.

Embodiment 5

In an embodiment 5 of the present invention, while local IDs are allocated in a wireless base station, this wireless base station establishes a relationship between the local IDs and the global IDs, and also, mutually converts these local/global IDs with each other. In this embodiment 5, a server identifies a sensor chip based upon only a global ID while the server does not pay any attention to a local ID. In the simplest installation, the respective wireless base stations completely and independently allocate local IDs. In this simplest installation case, since the exclusive characteristics of these local IDs are guaranteed only within communication areas of the respective wireless base stations, when a sensor chip is moved from a communication area of a wireless base station where the own sensor chip is present to another communication area of another wireless base station, the wireless base station of the move destination reallocates a local ID. In another installation case, in order to guarantee the exclusive characteristics of the local IDs within the system, the update information of the ID table is mutually exchanged between the relevant wireless base stations every time a new sensor chip is registered, and then, these wireless base stations may commonly hold the information of the ID table.

In a further embodiment of the present invention, while such an independent server apparatus as shown in FIG. 1 is not present, one specific wireless base station among a plurality of wireless base stations is equipped with a server function. For instance, it is so assumed that the wireless base station 111 shown in FIG. 1 corresponds to such a wireless base station having the function of the above-explained server apparatus.

When the wireless base station 112, or 113 receives a message transmitted from a sensor, this received message is transited to the wireless base station equipped with the function of the server apparatus 111, and then, is processed in the server function unit of this apparatus. When the wireless base station function unit of the wireless base station having the function of the server apparatus 111 receives the message from the sensor chip, this received message is internally transited to the server function unit employed in the own apparatus. In this case, a communication sequence between the wireless base station 111 and the server 131 within each of the communication sequences shown in FIG. 6, FIG. 12, FIG. 15 is replaced by an internal sequence of a single apparatus. This embodiment may be effectively applied to a relatively small-scaled sensor network system. This embodiment may achieve the following effect. That is, since the wireless base station function and the server function are installed in a compact housing in an integral manner, an installation space can be reduced and operating cost may be lowered. In a specific case of the present invention, such a sensor network system may be established by a relatively small number of sensor chips and a single set of the compact wireless base station having the function of the server apparatus. This specific arrangement may be useful for emphasizing progress in home use of sensor network systems.

As one of the methods capable of achieving a portion of the objects of the present invention, which is similar to the method of the present invention, there is such a method that a local ID may be generated not by a server, but by a sensor chip itself. For instance, such a method may be conceived that while a pseudo random number is generated, this pseudo random number is used as a local ID. Alternatively, a fixed calculation may be carried out with respect to a global ID so as to generate a local ID. Concretely speaking, since a specific hash calculation is executed with respect to the global ID, a local ID may be generated. Also, since a specific bit, for example, lower-grade 16 bits are extracted from a global ID, the bit-extracted global ID may be used as a local ID. More specifically, in the method for producing the local ID by executing the fixed calculation with respect to the global ID, the sensor chip need not store the local ID during operation. However, these methods own a common problem. That is, these is no guarantee that the local IDs which have been freely generated by these sensor chips may have the exclusive characteristics within the system, resulting in deteriorations of practical utilization, as compared with the method of the present invention in which the server may generate the local IDs having the exclusive characteristics. These methods own a serious problem, namely, how to reduce probability at which local IDs collide with each other, and how to recover collisions of the local IDs, which may not be easily solved.

In accordance with the present invention, the following condition is an initial condition. That is, the global IDs have been written in the ROM 240 in the maker of the sensor chip 101 before the shipment. This may be supposed that this initial condition is similar to the MAC addresses in Ethernet®. In the case of such MAC addresses, depending upon implementation of a NIF card, a MAC address stored in a ROM may be rewritten by a user. Alternatively, a value other than the value stored in the ROM may be stored in a device driver, and then, in an actual case, the first-mentioned value may be used. Also, while a plurality of MAC addresses are stored, these MAC addresses may be alternatively and separately used. Although these appliances and use methods are provided, the MAC addresses have been still written in the ROM before the shipment, but cannot be rewritten after shipment. Under such an operation condition of these MAC addresses, the above-described appliances and use methods may achieve useful effects.

While the above-explained idea may be similarly applied to the global IDs in the system of the present invention, even when global IDs are exceptionally rewritten, or are separately used in a small number of sensor chips, no adverse influence is given to the basic idea of the present invention, but also, such an exceptional using method is not refused in accordance with the present invention. Since there is such an initial condition that the global IDs originally own the exclusive characteristics in the world, a specific measure must be necessarily taken in order not to deteriorate the overall exclusive characteristics which are originally required in these global IDs as follows: That is, when a global ID is rewritten, a sequence capable of acquiring the formal global ID is defined; and a specific bit area of a global ID is defined as a local area which may be freely used by a user.

It should be understood that the technical scope of the present invention may involve the below-mentioned items:

A. A wireless communication system comprising: a plurality of wireless terminals; one, or more wireless base stations, and one, or more servers, wherein:

the wireless terminal includes:

wireless communication means for communicating with the wireless base station;

a global ID for uniquely identifying the wireless terminal;

means for transmitting the global ID to the server by employing the wireless communication means; and means for storing thereinto a local ID which is allocated to the wireless terminal by the server in correspondence with the global ID;

the wireless base station includes:

wireless communication means for communicating with the wireless terminal;

communication means for communicating with the server;

means for repeating a communication of the server to the wireless terminal; and means for storing thereinto a corresponding relationship between the global ID and the local ID so as to mutually convert the global ID and the local ID;

the server includes:

communication means for communicating with the wireless base station;

means for receiving the global ID from the wireless terminal by employing the communication means;

means for producing a local ID having a shorter bit length than a bit length of the global ID, which corresponds to the global ID of the wireless terminal in an one-to-one relationship;

means for storing thereinto a corresponding relationship between the global ID and the local ID so as to retrieve the local ID from the global ID; and means for transmitting the local ID to the wireless terminal by employing the communication means; and wherein:

the wireless base station repeats the communication between the wireless terminal and the server;

the wireless terminal transmits the global ID to the server in an initial communication;

the server allocates one piece of the local ID with respect to the global ID received from the wireless terminal, and then, transmits the allocated local ID to the wireless terminal and the wireless base station;

the wireless base station stores therein the corresponding relationship between the global ID and the local ID received from the server;

the wireless terminal stores thereinto the local ID received from the server; and in the subsequent communication, the local ID is used so as to identify the wireless terminal in a communication between the wireless terminal and the wireless base station;

the global ID is used so as to identify the wireless terminal in a communication between the server and the wireless base station;

when the wireless base station repeats the communication between the wireless terminal and the server, the wireless base station mutually converts the local ID and the global ID with each other.

B. A wireless communication system comprising: a plurality of wireless terminals; one, or more wireless base stations, and one, or more servers, wherein:

the wireless terminal includes:

wireless communication means for communicating with the wireless base station;

a global ID for uniquely identifying the wireless terminal;

means for transmitting the global ID to the server by employing the wireless communication means; and means for storing thereinto a local ID which is allocated to the wireless terminal by the server in correspondence with the global ID;

the wireless base station includes:

wireless communication means for communicating with the wireless terminal;

communication means for communicating with the server;

means for repeating a communication of the server to the wireless terminal;

means for receiving the global ID from the wireless terminal by employing the communication means;

means for producing a local ID having a shorter bit length than a bit length of the global ID, which corresponds to the global ID of the wireless terminal in an one-to-one relationship;

means for storing thereinto a corresponding relationship between the global ID and said local ID so as to mutually convert the global ID and said local ID with each other; and means for transmitting the local ID to the wireless terminal by employing the communication means; and wherein:

the server includes communication means for communicating with the wireless base station;

the wireless terminal transmits the global ID to the wireless base station in an initial communication;

the wireless base station allocates one piece of the local ID with respect to the global ID received from the wireless terminal, and then, transmits the allocated local ID to the wireless terminal;

the wireless terminal stores thereinto the local ID received from the wireless base station; and in the subsequent communication, the wireless base station repeats the communication between the wireless terminal and the server;

the local ID is used so as to identify the wireless terminal in a communication between the wireless terminal and the wireless base station;

the global ID is used so as to identify the wireless terminal in a communication between the server and the wireless base station;

when the wireless base station repeats the communication between the wireless terminal and the server, the wireless base station mutually converts the local ID and the global ID with each other.

C. A wireless communication system as recited in the item B, wherein:

the wireless communication system is connected to a broadband network;

the server includes:

means for storing thereinto identification information which owns an exclusive characteristic within the communication system and corresponds to the global ID of the wireless terminal in one-to-one correspondence;

means for storing thereinto a correspondence relationship between the global ID and the identification information so as to mutually convert the global ID and the identification information; and at least one of means for providing information related to the wireless terminal with respect to the external communication apparatus, and means for repeating a communication between the external communication apparatus and either the wireless terminal or the wireless base station;

the server performs a direct communication with the external communication apparatus as a representative apparatus;

either the wireless terminal or the wireless base station is capable of indirectly communicating with the external communication apparatus via the server;

the server uses the identification information when the wireless terminal is identified in the communication with the external communication apparatus; and the server uses the local ID when the wireless terminal is identified in a communication made inside a system with respect to either the wireless terminal or the wireless base station while the server repeats the communication between either the wireless terminal or the wireless base station and the external communication apparatus;

the server uses said identification information when the wireless terminal is identified in a communication made outside the system with respect to the external communication apparatus; and the server mutually converts the local ID and the identification information with each other when the server repeats the communication made inside the system and the communication made outside the system.

D. A communication system comprising: a plurality of terminals, and one, or more base stations; wherein:

the terminal includes:

communication means for communicating with the base station;

a first memory for storing thereinto a first ID which uniquely identifies a terminal; and a second memory for storing thereinto a second ID corresponding to the first ID;

the base station includes:

communication means for communicating with the terminal; and wherein:

the terminal transmits the first ID to the base station, receives the second ID corresponding to the first ID from the base station, stores the received second ID into the memory, and uses the second ID in the subsequent communication.

E. A communication system recited in the item D wherein:

the terminal transmits the first ID to the base station;

the base station transmits the first ID to the server apparatus; and the server apparatus generates a second ID having a shorter bit length than the bit length of the first ID, which corresponds to the first ID in one-to-one correspondence, and stores thereinto a corresponding relationship between the first ID and said second ID.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system comprising:
a plurality of wireless terminals; one or more wireless base stations, and one or more servers, wherein:
said wireless communication system is connected to an external communication apparatus through a wide area network,
a wireless terminal of said plurality of wireless terminals, includes:
a wireless communication unit for communicating with said wireless base station;
a unit for storing a global ID which is inherent in said wireless terminal for uniquely identifying said wireless terminal;
a unit for transmitting said global ID to said server by employing said wireless communication unit; and
a memory for storing thereinto a local ID which is allocated to said wireless terminal by said server in correspondence with said global ID;
a wireless base station of said one or more wireless base stations, includes:
a wireless communication unit for communicating with said wireless terminal; and
a communication unit for communicating with said server;
a server of said one or more servers, includes:
a communication unit for communicating with said wireless base station;
a unit for receiving the global ID from said wireless terminal by employing said communication unit;
a unit for producing the local ID having a shorter bit length than a bit length of said global ID, which corresponds to the global ID of said wireless terminal in an one-to-one relationship;
a memory for storing thereinto a corresponding relationship between said global ID and said local ID so as to mutually convert said global ID and said local ID with each other; and
a unit for transmitting said local ID to said wireless terminal by employing said communication unit; and wherein:
said wireless base station repeats the communication between said wireless terminal and said server;
said wireless terminal transmits said global ID to said server in an initial communication;
said server allocates one piece of said local ID with respect to said global ID received from said wireless terminal, and then, transmits an allocated said local ID to said wireless terminal;
said wireless terminal stores thereinto said local ID received from said server; and
in a subsequent communication, said server uses said local ID in communication with said wireless base station so as to identify said wireless terminal, converts said local ID to said global ID and uses said converted global ID in communication with said external communication apparatus so as to identify said wireless terminal, said server being arranged:
(1) to have a unit for commencing a communication sequence which reallocates a useable local ID to said wireless terminal at an arbitrary time instant during operation, (2) to calculate cost required for performing communication processing at each of said plurality of wireless terminals in response to the communication sequence commenced, and (3) to allocate another local ID to each of said plurality of wireless terminals in accordance with the cost having been calculated; and
said wireless terminal is operated in such a manner that said local ID is allocated thereto from said server in an initial communication; after said wireless terminal is operated for an arbitrary time period by using said local ID, said another local ID is reallocated thereto from said server since said communication sequence is commenced by said wireless terminal or said server; and said wireless terminal is subsequently operated by using said another local ID.

2. A wireless communication system according to claim 1 wherein:
both said wireless base station and said server correspond to a single apparatus.

3. A wireless communication system according to claim 1, wherein:
the wireless communication system is connected to a broadband network;
the server includes:
unit for storing thereinto identification information which owns an exclusive characteristic within the communication system and corresponds to the global ID of the wireless terminal in one-to-one correspondence;
unit for storing thereinto a correspondence relationship between the global ID and the identification information so as to mutually convert the global ID and the identification information; and
at least one of unit for providing information related to the wireless terminal with respect to the external communication apparatus, and unit for repeating a communication between the external communication apparatus and either the wireless terminal or the wireless base station;
the server performs a direct communication with the external communication apparatus as a representative apparatus;
either the wireless terminal or the wireless base station is capable of indirectly communicating with the external communication apparatus via the server;
the server uses the identification information when the wireless terminal is identified in the communication with the external communication apparatus; and
the server uses the local ID when the wireless terminal is identified in a communication made inside a system with respect to either the wireless terminal or the wireless base station while the server repeats the communication between either the wireless terminal or the wireless base station and, the external communication apparatus;
the server uses said identification information when the wireless terminal is identified in a communication made outside the system with respect to the external communication apparatus; and
the server mutually converts the local ID and the identification information with each other when the server repeats the communication made inside the system and the communication made outside the system.

4. A wireless communication system according to claim 1, wherein said local ID is recognized only in communications between said wireless terminal, said wireless base station and said server, and wherein said global ID is recognized in communications between, and beyond, said wireless terminal, said wireless base station and said server.

5. A wireless communication system according to claim 1, wherein said local ID is not a sub-part of said global ID.

6. A server which is connected to a communication system comprising: a plurality of terminals, and one or more base stations which communicate with said terminals in a wireless manner, wherein:
said server is connected to an external communication apparatus through a wide area network,
said server includes:
a communication unit for communicating with said base stations;
a memory; and
a controller for controlling both said communication unit and said memory; and
wherein: when a first ID which is inherent in said terminal for specifying a terminal's own terminal transmitted via said base station from said terminal is received by said communication unit, said controller generates a second ID having a shorter bit length than a bit length of said first ID in correspondence with said first ID in an one-to-one correspondence; said controller stores a generated said second ID into said memory; and said controller transmits said second ID to said terminal by using said communication unit, and in a subsequent communication, said server uses said second ID in communication with said base station so as to identify said terminal, converts said second ID to said first ID and uses said converted first ID in communication with said external communication apparatus so as to identify said terminal, said server being arranged:
(1) to have a unit for commencing a communication sequence which reallocates a useable second ID as a local ID to said wireless terminal at an arbitrary time instant during operation, (2) to calculate cost required for performing communication processing at each of said plurality of terminals in response to the communication sequence commenced, and (3) to allocate another second ID as the local ID to each of said plurality of terminals in accordance with the cost having been calculated; and
said wireless terminal is operated in such a manner that said second ID is allocated thereto from said server in an initial communication; after said wireless terminal is operated for an arbitrary time period by using said second ID, the another second ID is reallocated thereto from said server since said communication sequence is commenced by said wireless terminal, or said server; and said wireless terminal is subsequently operated by using said another second ID.

7. A server as claimed in claim 6 wherein:
said memory stores thereinto a correspondence table between said first ID and second ID.

8. A server according to claim 6, wherein said first ID is recognized only in communications between said terminals, said base station and said server, and wherein said second ID is recognized in communications between, and beyond, said terminals, said base station and said server.

9. A server according to claim 6, wherein said first ID is not a sub-part of said second ID.

10. A wireless communication system comprising:

a plurality of wireless terminals, at least one wireless base station communicable with each of said plurality of wireless terminals and at least one server connected with the wireless base station through a network, wherein said wireless communication system is connected to an external communication apparatus through a wide area network, each of said plurality of wireless terminals includes:

a wireless communication unit for communicating with the wireless base station with a global ID which is inherent in said wireless terminal for uniquely identifying each of the wireless terminal, the wireless communication unit being arranged to transmit the global ID to the server, and a memory unit for storing a local ID which has been produced at the server based on the global ID, and has been allocated to each of said plurality of wireless terminals, a wireless base station of said at least one wireless base station includes:

a wireless communication unit for communicating with each of of said plurality of wireless terminals, and a communication unit for communicating with the server through the network, and a server of said at least one server includes:

a receiving unit for receiving the global ID having been sent from each of the plurality of wireless terminal through the wireless base station, and a producing unit for producing a local ID according to the global ID received at the receiving unit with a shorter bit length than a bit length of the global ID with smaller power consumption and data amount for a communication as compared with a communication using the global ID, which corresponds to the global ID of each of the plurality of wireless terminal in an one-to-one relationship, and wherein in a communication after said local ID has been stored, said server uses said local ID in communication with said wireless base station so as to identify said wireless terminal, converts said local ID to said global ID and uses said converted global ID in communication with said external communication apparatus so as to identify said wireless terminal, said server being arranged:

(1) to have a unit for commencing a communication sequence which reallocates a useable local ID to said wireless terminal at an arbitrary time instant during operation, (2) to calculate cost required for performing communication processing at each of said plurality of wireless terminals in response to the communication sequence commenced, and (3) to allocate another local ID to each of said plurality of wireless terminals in accordance with the cost having been calculated; and said wireless terminal is operated in such a manner that said local ID is allocated thereto from said server in an initial communication; after said wireless terminal is operated for an arbitrary time period by using said local ID, said another local ID is reallocated thereto from said server since said communication sequence is commenced by said wireless terminal, or said server; and said wireless terminal is subsequently operated by using said another local ID.

11. The wireless communication system according to claim 10, wherein each of said plurality of wireless terminals is arranged to forward a global ID as an initial communication with a request toward the server, wherein the server produces a local ID for each of said plurality of wireless terminals in response to the request, and wherein each said plurality of wireless terminals and the wireless base station subsequently communicate with each other with using the local ID having been produced at the server.

12. A wireless communication system according to claim 11, wherein said local ID is recognized only in communications between said wireless terminal, said wireless base station and said server, and wherein said global ID is recognized in communications between, and beyond, said wireless terminal, said wireless base station and said server.

13. A wireless communication system according to claim 11, wherein said local ID is not a sub-part of said global ID.

* * * * *